(12) United States Patent
Haberman et al.

(10) Patent No.: US 7,382,796 B2
(45) Date of Patent: Jun. 3, 2008

(54) SYSTEM AND METHOD FOR SEAMLESS SWITCHING THROUGH BUFFERING

(75) Inventors: Seth Haberman, New York, NY (US); Richard L. Booth, Bensalem, PA (US); Alex Jansen, New York, NY (US); Gerrit Niemeijer, Maplewood, NJ (US)

(73) Assignee: Visible World, Inc., New York, NY (US)

( * ) Notice: Subject to any disclaimer, the term of this patent is extended or adjusted under 35 U.S.C. 154(b) by 1044 days.

(21) Appl. No.: 10/369,047

(22) Filed: Feb. 19, 2003

(65) Prior Publication Data

US 2003/0142689 A1    Jul. 31, 2003

Related U.S. Application Data

(63) Continuation-in-part of application No. 09/735,983, filed on Dec. 13, 2000.

(60) Provisional application No. 60/357,804, filed on Feb. 15, 2002.

(51) Int. Cl.
*H04L 12/54* (2006.01)

(52) U.S. Cl. ............... 370/429; 370/486; 370/537; 725/135

(58) Field of Classification Search ............... 370/429, 370/486, 487, 535, 537; 725/32, 38, 59, 725/135

See application file for complete search history.

(56) References Cited

U.S. PATENT DOCUMENTS

| | | | |
|---|---|---|---|
| 3,366,731 A | 1/1968 | Wallerstein | 358/86 |
| 3,639,686 A | 2/1972 | Walker et al. | 455/4.1 |
| 4,331,974 A | 5/1982 | Cogswell et al. | 358/86 |
| 4,475,123 A | 10/1984 | Dumbauld et al. | 358/86 |
| 4,573,072 A | 2/1986 | Freeman | 358/86 |
| 4,602,279 A | 7/1986 | Freeman | 358/86 |
| 4,625,235 A | 11/1986 | Watson | 358/86 |
| 4,638,359 A | 1/1987 | Watson | 358/142 |
| 4,703,423 A | 10/1987 | Bado et al. | 395/201 |
| 4,716,410 A | 12/1987 | Nozaki | 358/86 |
| 4,789,235 A | 12/1988 | Borah et al. | 351/246 |
| 4,814,883 A | 3/1989 | Perine et al. | 358/181 |
| 4,847,698 A | 7/1989 | Freeman | 358/343 |
| 4,847,699 A | 7/1989 | Freeman | 358/343 |
| 4,847,700 A | 7/1989 | Freeman | 358/343 |
| 4,850,007 A | 7/1989 | Marino et al. | 379/67 |
| 4,918,516 A | 4/1990 | Freeman | 358/86 |

(Continued)

*Primary Examiner*—Min Jung
(74) *Attorney, Agent, or Firm*—Wilmer Cutler Pickering Hale & Dorr LLP

(57) ABSTRACT

A method of preparing data streams to facilitate seamless switching between such streams by a switching device to produce an output data stream without any switching artifacts. Bi-directional switching between any plurality of data streams is supported. The data streams are divided into segments, wherein the segments include synchronized starting points and end points. The data rate is increased before an end point of a segment, to create switch gaps between the segments. Increasing the data rate can include increasing a bandwidth of the plurality of data streams, for example by multiplexing, or compressing the data.

The present invention can be used, for example, with MPEG or AC-3 encoded audio and MPEG encoded video segments that are multiplexed into MPEG-2 transport streams.

Also included are specific methods for preparing MPEG video streams and multiplexing MPEG video with MPEG or AC-3 audio streams to allow a receiver to create seamless transitions between individually encoded segments.

19 Claims, 15 Drawing Sheets

U.S. PATENT DOCUMENTS

| | | | |
|---|---|---|---|
| 5,099,422 A | 3/1992 | Foresman et al. | 358/86 |
| 5,105,184 A | 4/1992 | Pirani et al. | 345/115 |
| 5,155,591 A | 10/1992 | Wachob | 455/4.2 |
| 5,173,900 A | 12/1992 | Miller et al. | 370/110.1 |
| 5,220,501 A | 6/1993 | Lawlor et al. | 380/24 |
| 5,231,494 A | 7/1993 | Wachob | 358/146 |
| RE34,340 E | 8/1993 | Freeman | 358/86 |
| 5,253,940 A | 10/1993 | Abecassis | 400/495 |
| 5,260,778 A | 11/1993 | Kauffman et al. | 358/86 |
| 5,291,395 A | 3/1994 | Abecassis | 364/401 |
| 5,305,195 A | 4/1994 | Murphy | 705/1 |
| 5,343,239 A | 8/1994 | Lappington et al. | 348/12 |
| 5,347,632 A | 9/1994 | Filepp et al. | 395/200.32 |
| 5,356,151 A | 10/1994 | Abecassis | 273/243 |
| 5,361,393 A | 11/1994 | Rossillo | 395/651 |
| 5,377,354 A | 12/1994 | Scannell et al. | 395/673 |
| 5,414,455 A | 5/1995 | Hooper et al. | 348/7 |
| 5,422,468 A | 6/1995 | Abecassis | 235/380 |
| 5,424,770 A | 6/1995 | Schmelzer et al. | 348/9 |
| 5,426,281 A | 6/1995 | Abecassis | 235/379 |
| 5,434,678 A | 7/1995 | Abecassis | 358/342 |
| 5,442,390 A | 8/1995 | Hooper et al. | 348/7 |
| 5,442,771 A | 8/1995 | Filepp et al. | 395/200.49 |
| 5,446,919 A | 8/1995 | Wilkins | 455/6.2 |
| 5,448,568 A | 9/1995 | Delpuch et al. | 372/94.2 |
| 5,499,046 A | 3/1996 | Schiller et al. | 348/6 |
| 5,515,098 A | 5/1996 | Carles | 348/8 |
| 5,515,270 A | 5/1996 | Weinblatt | 395/214 |
| 5,519,433 A | 5/1996 | Lappington et al. | 348/2 |
| 5,526,035 A | 6/1996 | Lappington et al. | 348/13 |
| 5,537,141 A | 7/1996 | Harper et al. | 348/12 |
| 5,548,532 A | 8/1996 | Menand et al. | 364/514 |
| 5,550,735 A | 8/1996 | Slade et al. | |
| 5,566,353 A | 10/1996 | Cho et al. | 455/2 |
| 5,584,025 A | 12/1996 | Keithley et al. | 707/104 |
| 5,585,838 A | 12/1996 | Lawler et al. | |
| 5,585,858 A | 12/1996 | Harper et al. | 348/485 |
| 5,594,910 A | 1/1997 | Filepp et al. | 395/800.28 |
| 5,610,653 A | 3/1997 | Abecassis | 348/110 |
| 5,617,142 A | 4/1997 | Hamilton | 348/405 |
| 5,632,007 A | 5/1997 | Freeman | 395/75 |
| 5,634,849 A | 6/1997 | Abecassis | 463/30 |
| 5,636,346 A | 6/1997 | Saxe | 395/201 |
| 5,638,113 A | 6/1997 | Lappington et al. | 348/12 |
| 5,652,615 A | 7/1997 | Bryant et al. | |
| 5,671,225 A | 9/1997 | Hooper et al. | 370/468 |
| 5,682,196 A | 10/1997 | Freeman | 348/13 |
| 5,684,918 A | 11/1997 | Abecassis | 386/83 |
| 5,696,869 A | 12/1997 | Abecassis | 386/52 |
| 5,717,814 A | 2/1998 | Abecassis | 386/46 |
| 5,717,923 A | 2/1998 | Dedrick | 707/102 |
| 5,724,091 A | 3/1998 | Freeman et al. | 348/13 |
| 5,724,472 A | 3/1998 | Abecassis | 386/52 |
| 5,724,521 A | 3/1998 | Dedrick | 705/26 |
| 5,734,413 A | 3/1998 | Lappington et al. | 348/12 |
| 5,740,388 A | 4/1998 | Hunt | 395/328 |
| 5,740,549 A | 4/1998 | Reilly et al. | 705/14 |
| 5,754,939 A | 5/1998 | Herz et al. | 455/4.2 |
| 5,758,259 A | 5/1998 | Lawler | |
| 5,761,601 A | 6/1998 | Nemirofsky et al. | 455/3.1 |
| 5,764,275 A | 6/1998 | Lappington et al. | 348/12 |
| 5,768,521 A | 6/1998 | Dedrick | 395/200.54 |
| 5,774,170 A | 6/1998 | Hite et al. | 348/9 |
| 5,774,664 A | 6/1998 | Hidary et al. | 395/200.48 |
| 5,778,181 A | 7/1998 | Hidary et al. | 395/200.48 |
| 5,784,095 A | 7/1998 | Robbins et al. | 348/6 |
| 5,784,528 A | 7/1998 | Yamane et al. | 386/112 |
| 5,796,945 A | 8/1998 | Tarabella | 395/200.49 |
| 5,802,314 A | 9/1998 | Tullis et al. | 395/200.76 |
| 5,805,974 A | 9/1998 | Hite et al. | |
| 5,825,884 A | 10/1998 | Zdepski et al. | 380/25 |
| 5,835,087 A | 11/1998 | Herz et al. | 345/327 |
| 5,859,660 A * | 1/1999 | Perkins et al. | 725/32 |
| 5,861,881 A | 1/1999 | Freeman et al. | 345/302 |
| 5,867,208 A | 2/1999 | McLaren | 348/13 |
| 5,873,068 A | 2/1999 | Beaumont et al. | |
| 5,887,243 A | 3/1999 | Harvey et al. | 455/3.1 |
| 5,903,263 A | 5/1999 | Emura et al. | |
| 5,907,837 A | 5/1999 | Ferrel et al. | 707/3 |
| 5,913,031 A | 6/1999 | Blanchard | 395/200.34 |
| 5,917,830 A | 6/1999 | Chen et al. | 370/487 |
| 5,926,205 A * | 7/1999 | Krause et al. | 725/103 |
| 5,929,850 A | 7/1999 | Broadwin et al. | 345/327 |
| 5,931,901 A | 8/1999 | Wolfe et al. | 709/206 |
| 5,937,331 A | 8/1999 | Kalluri et al. | 455/6.1 |
| 5,978,799 A | 11/1999 | Hirsch | 707/4 |
| 5,986,692 A | 11/1999 | Logan et al. | 348/13 |
| 5,991,735 A | 11/1999 | Gerace | 705/10 |
| 6,002,393 A | 12/1999 | Hite et al. | 345/327 |
| 6,018,768 A | 1/2000 | Ullman et al. | 709/218 |
| 6,026,368 A | 2/2000 | Brown et al. | 705/14 |
| 6,029,045 A | 2/2000 | Picco et al. | 455/5.1 |
| 6,038,000 A | 3/2000 | Hurst, Jr. | 348/845 |
| 6,038,367 A | 3/2000 | Abecassis | 386/46 |
| 6,049,569 A | 4/2000 | Radha et al. | 375/240 |
| 6,067,348 A | 5/2000 | Hibbeler | 379/88.16 |
| 6,075,551 A | 6/2000 | Berezowski et al. | 348/9 |
| 6,108,486 A | 8/2000 | Sawabe et al. | 386/98 |
| 6,137,834 A | 10/2000 | Wine et al. | 375/240 |
| 6,141,358 A | 10/2000 | Hurst, Jr. et al. | 370/543 |
| 6,160,570 A | 12/2000 | Sitnik | 348/1 |
| 6,304,852 B1 | 10/2001 | Loncteaux | 705/14 |
| 6,310,915 B1 | 10/2001 | Wells et al. | |
| 6,327,574 B1 | 12/2001 | Kramer et al. | 705/14 |
| 6,330,286 B1 | 12/2001 | Lyons et al. | |
| 6,343,287 B1 | 1/2002 | Kumar et al. | 707/4 |
| 6,345,122 B1 * | 2/2002 | Yamato et al. | 382/232 |
| 6,357,042 B2 | 3/2002 | Srinivasan et al. | |
| 6,360,234 B2 | 3/2002 | Jain et al. | |
| 6,408,278 B1 | 6/2002 | Carney et al. | |
| 6,411,992 B1 | 6/2002 | Srinivasan | 709/218 |
| 6,424,991 B1 | 7/2002 | Gish | 709/203 |
| 6,449,657 B2 | 9/2002 | Stanbach, Jr. et al. | 709/245 |
| 6,457,010 B1 | 9/2002 | Eldering et al. | |
| 6,463,444 B1 | 10/2002 | Jain et al. | |
| 6,463,585 B1 | 10/2002 | Hendricks et al. | 725/35 |
| 6,466,975 B1 | 10/2002 | Sterling | 709/223 |
| 6,502,076 B1 | 12/2002 | Smith | |
| 6,529,550 B2 * | 3/2003 | Tahara et al. | 375/240 |
| 6,567,980 B1 | 5/2003 | Jain et al. | |
| 6,574,793 B1 | 6/2003 | Ngo et al. | |
| 6,588,013 B1 | 7/2003 | Lumley et al. | |
| 6,601,237 B1 | 7/2003 | Ten Kate et al. | |
| 6,611,624 B1 | 8/2003 | Zhang et al. | |
| 6,671,880 B2 | 12/2003 | Shah-Nazaroff et al. | |
| 6,678,332 B1 | 1/2004 | Gardere et al. | |
| 6,681,395 B1 | 1/2004 | Nishi et al. | |
| 6,694,482 B1 | 2/2004 | Arellano et al. | |
| 6,698,020 B1 | 2/2004 | Zigmond et al. | |
| 6,735,628 B2 | 5/2004 | Eyal | |
| 6,785,289 B1 * | 8/2004 | Ward et al. | 370/412 |
| 6,806,909 B1 | 10/2004 | Radha et al. | |
| 6,850,252 B1 | 2/2005 | Hoffberg | |
| 6,857,024 B1 | 2/2005 | Chen et al. | |
| 6,877,134 B1 | 4/2005 | Fuller et al. | |
| 7,079,176 B1 * | 7/2006 | Freeman et al. | 348/207.1 |
| 2001/0013124 A1 | 8/2001 | Klosterman et al. | |
| 2002/0026359 A1 | 2/2002 | Long et al. | |
| 2002/0056093 A1 | 5/2002 | Kunkel et al. | |
| 2002/0057336 A1 | 5/2002 | Gaul et al. | |
| 2002/0083443 A1 | 6/2002 | Eldering et al. | |
| 2002/0092017 A1 | 7/2002 | Klosterman et al. | 725/35 |
| 2002/0095676 A1 | 7/2002 | Knee et al. | 725/46 |
| 2003/0110500 A1 | 6/2003 | Rodriguez | |

| | | | | | |
|---|---|---|---|---|---|
| 2003/0177503 | A1 | 9/2003 | Sull et al. | | |
| 2004/0025180 | A1 | 2/2004 | Begeja et al. | | |
| 2004/0111742 | A1 | 6/2004 | Hendricks et al. | | |
| 2004/0136698 | A1 | 7/2004 | Mock | | |
| 2005/0086691 | A1 | 4/2005 | Dudkiewicz et al. | | |
| 2005/0086692 | A1 | 4/2005 | Dudkiewicz et al. | | |
| 2005/0166224 | A1 | 7/2005 | Ficco | | |

* cited by examiner

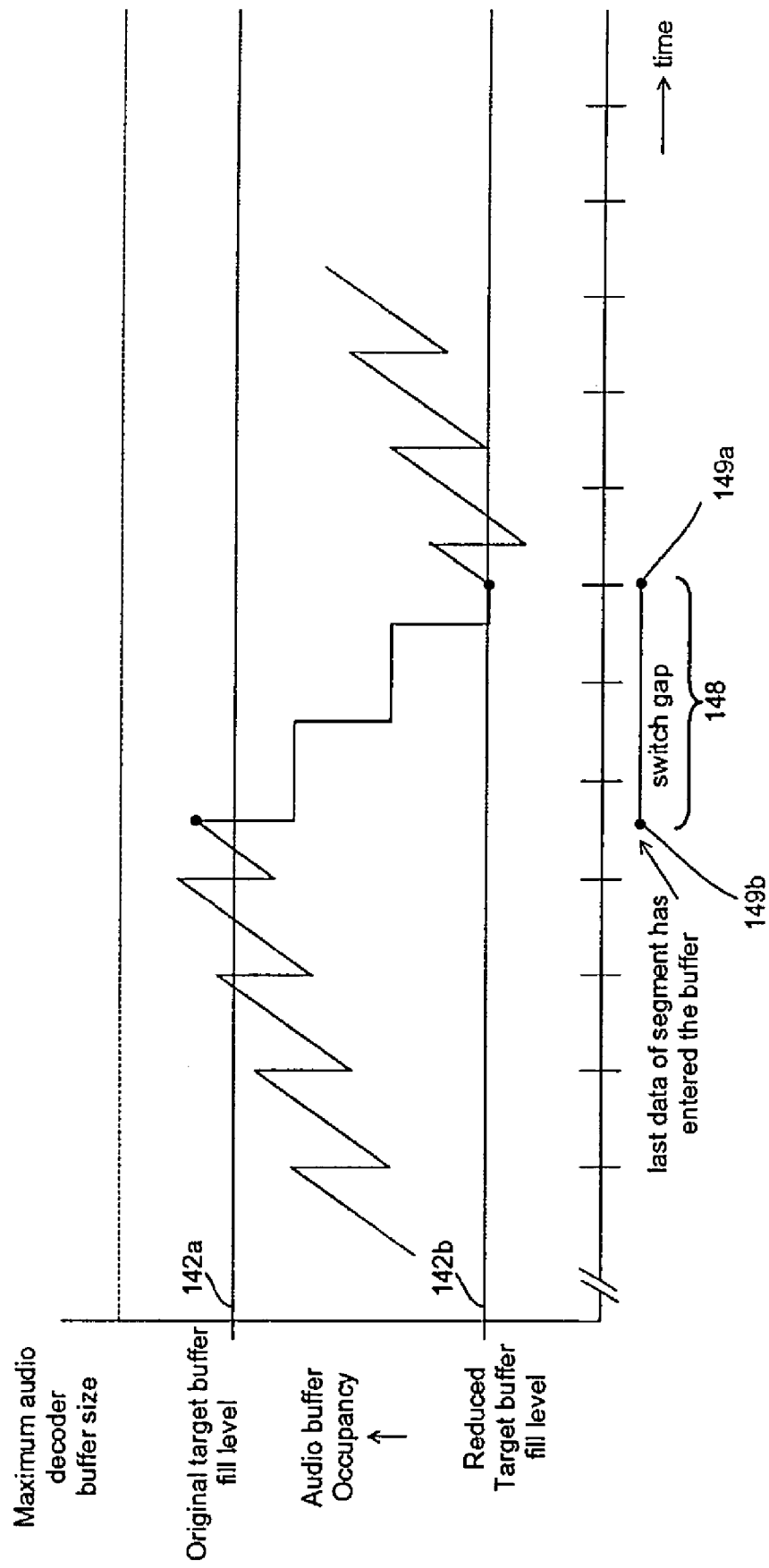

SYSTEM AND METHOD FOR SEAMLESS SWITCHING THROUGH BUFFERING

CROSS-REFERENCE TO RELATED APPLICATIONS

This patent application claims priority from U.S. Provisional Application Ser. No. 60/357,804 filed Feb. 15, 2002 by Haberman et al., which is incorporated herein by reference.

This patent application is a continuation-in-part from U.S. application Ser. No. 09/735,983 filed on Dec. 13, 2000 which is incorporated herein by reference.

FIELD OF THE INVENTION

This disclosure relates generally to a system and method for transmitting data and, more particularly, to a system and method of seamless switching between a plurality of data streams.

BACKGROUND

Typical television broadcasts do not allow personalization of television content to a viewer's profile. The standard television broadcast provides only one variant of every channel. The channel is selected by the viewer and the reception equipment (whether a television, a set-top-box, or any means of reception) selects the video and audio for that channel from the broadcast material. While this system allows the viewer to select their favorite channel or show from the available set, the individual viewer will be watching exactly the same content as everyone else that selects that channel.

Due to the fact that channels are created to attract a wide range of viewers, viewers typically have different preferred channels. Disadvantageously, this is particularly evident when a program being broadcast on a channel is interrupted by a commercial advertisement that does not appeal to the interests of the viewer. The inevitable result is that the viewer will switch to another channel to avoid watching that particular commercial advertisement. It would be advantageous to personalize channels to be viewed by a viewer tailored to their particular interests and personal situations. For example, inclusion of personalized commercial advertisements will make such messages more relevant to the viewer, reducing the desire to change the channel being viewed.

A method of creating personalized messages is disclosed in co-pending U.S. patent application Ser. No. 09/841,465 filed on Apr. 24, 2001, which is incorporated herein by reference. One technique which can assist in the process of assembling personalized messages is the ability to switch rapidly between multiple data streams (such as audio and/or video feeds) that are received simultaneously, in order to assemble the message in real time, possibly as the message is being viewed by the end user.

However, switching between multiple data streams is problematic. One problem is that switching typically is not instantaneous. With present technology, it is difficult to switch from one high-bandwidth digital data stream to another without missing some data in at least one of the streams. This is true no matter what the type of data in the stream is, including audio, video, graphics, etc., or the type of switch, whether hardware (such as an integrated circuit), software or a combination of the two. Also, timing the switch point to minimize data interruption is very difficult.

Switching between two streams typically results in artifacts due to loss of data or sometimes even introduction of erroneous data,. For multimedia (such as television) signals, switching introduces very audible and visible artifacts in the sound and picture.

An example of this switching problem appears in MPEG based digital television. MPEG defines standards for digital television signals. The MPEG standards include the capability for compressing, coding and transmitting high-quality multi-channel, multimedia signals over a variety of broadband networks. MPEG encodes media signals as sequences of frames, and switching between separate sequences of frames multiplexed in, e.g., MPEG-2 transport streams takes a non-zero amount of time, and is usually partly executed in hardware and partly in software. In addition, only at certain moments in time a switch is actually allowed due to dependencies between groups of data in MPEG (frame accurate switching is required). To illustrate this further, FIG. 1 shows switching and decoding components of an example digital television receiver 20. The transport stream 48 carrying multiple encoded data streams enters the demux (demultiplexer) 32. This demux 32 serves as the switch, by selecting which video and which audio data stream in the multiplexed transport stream 48 to pass on. These streams are then decoded respectively by a video decoder 42 and an audio decoder 44 (with buffers 38 and 37 for the encoded data between the demux 32 and the decoders 42 and 44). The results of the decoding are a stream of video frames 40 and audio samples 38, which can then be sent to display and audio equipment. The decoder is controlled by a receiver controller 46, which typically uses a microprocessor and software.

Normally, when switching between different video and audio streams within the Transport Stream 48, the receiver controller 46 first mutes/blanks the affected decoder, (as shown by arrows 43 and 45, then switches the Demux 32 settings and then unmutes/unblanks the decoder(s). This will present a moment of silence/black to the viewer. It will never be a seamless switch for the viewer.

In an attempt to get a seamless switch, the mute/unmute sequence may be skipped. Now, however, the results depend on the exact moment of the switch with respect to the incoming data from the transport stream. Digital compression and transmission creates interdependencies between groups of video frames because of encoding and packaging and groups of audio samples because of packaging. Only at certain points within each data stream within the transport stream is it possible to switch out of the current stream without having visible and/or audible artifacts (safe exit point). Similarly only at certain points within each data stream within the transport stream, it is possible to switch into that stream without having visible and/or audible artifacts (safe entry point). The requirement of exactly hitting a combination of safe exit and safe entry point make the seamless switch very difficult. In addition to this, the decoders 42, 44 are typically the only devices in the receiver 20 that can detect the right switching moments, while the demux 32 is the device that must be switched. Because of extensive data buffering between the demux and the decoders, detection by the decoder is of no use to determine the right moment to switch the demux.

One solution would be to build new receivers with specialized hardware and software (possibly including additional buffering at several locations in the receiver) to support seamless switching. However, this solution increases the cost and complexity of receivers, and can not take advantage of the existing receivers on the market.

SUMMARY

In accordance with the present invention, there is provided a transmission system and method for seamlessly switching between a plurality of data streams to produce an output data stream with minimal or without any switching artifacts. Preferably, the seamless switch includes no visual or audible artifacts during reproduction of data. The disclosed transmission system and method for seamless switching may be utilized in applications including broadcasts where frame and sample accurate switching in a digital television environment is required. The system and method can facilitate multi-directional switching and does not require extensive modification to existing devices. Most desirably, the present disclosure finds application in personalized television.

The present invention includes a method of preparing a plurality of data streams to allow seamless switching between the data streams by a switching device that provides buffering of data. The method includes providing a plurality of data streams, where the data streams include data which is divided into segments that include synchronized starting points and end points on all of said plurality of data streams. The method includes providing gaps in the data streams between the end points and starting points, and increasing a data rate of the data streams at a time before an end point of a segment. This increase of the data rate can be performed by a number of techniques, alone or in combination, including (variations in) multiplexing and (variations in) compression. The present invention includes switching from one of the plurality of data streams to another one of the data streams at an end point of a segment. Gap trigger indicators can be inserted in the data streams proximate the end points, to indicate to a switch that a switch point is present or imminent. The switch exploits the presence of the gap to create the desired seamless switch.

An illustrative embodiment of the present invention is used to encode multimedia data streams using MPEG and/or AC-3 compliant encoders and multiplex the encoded streams into MPEG-2 transport streams. This allows a receiver, such as a digital set top box, to seamlessly switch between multiple channels and produce output with no switching artifacts.

U.S. Pat. No. 5,913,031 issued to Blanchard describes an encoder for system level buffer management. However this patent describes maintaining a substantially constant data stream rate, with minor long-term adjustments to keep a post-switch frame buffer(s) full. This patent uses complex signal data rate analysis to maintain full frame buffers, and does not disclose a feature of adjusting a data rate to momentarily increase storage in the frame buffers. Further, this patent does not teach the creation of gaps in a data stream. Finally, this patent focuses on maintaining full buffers only through compression of data.

An advantage of the present invention is a transmission system and method of seamlessly switching between a plurality of data streams to produce an output data stream without any switching artifacts.

Another advantage of the present invention includes a system and method for seamless switching using presently deployed receiver systems such as digital set top boxes (STB). No extra buffering is required to be added to present receivers.

Another advantage of the present invention includes a system and method for seamless switching that facilitates multi-directional switching and does not require extensive modification to the existing devices.

Yet another advantage of the present invention includes a system and method for seamless switching that can be employed with personalized television applications.

BRIEF DESCRIPTION OF THE DRAWINGS

The accompanying drawings, referred to herein and constituting a part hereof, illustrate the exemplary embodiments of the system and method for seamless switching of the present invention and, together with the description, serve to explain the principals of the invention.

FIG. 15 shows an audio buffer occupancy without overflows resulting from increasing the transmission rate of audio and multiplexing with a lower target buffer fill level.

DETAILED DESCRIPTION

The present invention finds utility in various data transmission applications including, but not limited to, transmission, reception and decoding of digital broadcast television (whether distributed via cable, terrestrial, satellite, microwave, etc.), assembly and preparation of television-on-demand (such as video-on-demand); encoding, multiplexing, and decoding of MPEG and AC-3 based multimedia streams; creation and playback of Digital Versatile Disk (DVD); Transmission and reception of data streams over cellular, and internet networks, etc.

Generally, switching between two or more data streams that are received simultaneously takes a non-zero amount of time, during which data from one or both of the streams is lost. In a digital television receiver for example, the input streams for audio and video are time multiplexed with other information into a transport stream. This time multiplexing makes it necessary to send the audio and video data in bursts and ahead of the presentation time. The data is buffered in the receiver 20 FIG. 1 and played out at a predetermined moment relative to a presentation clock. Because of the way that digital television receivers are constructed, the switching mechanism that allows the selection of video and audio streams from the transport stream is located before the playback buffering. And because the data is transmitted in burst-mode, there is no way to know the fill level of the buffer without detailed knowledge of the incoming transport stream, and the current playback time of the receiver. There is also no way to know where in time the other video (or audio) stream transmissions are in relation to the current video (or audio) stream, since such streams are typically not synchronized to each other.

Figure 2:
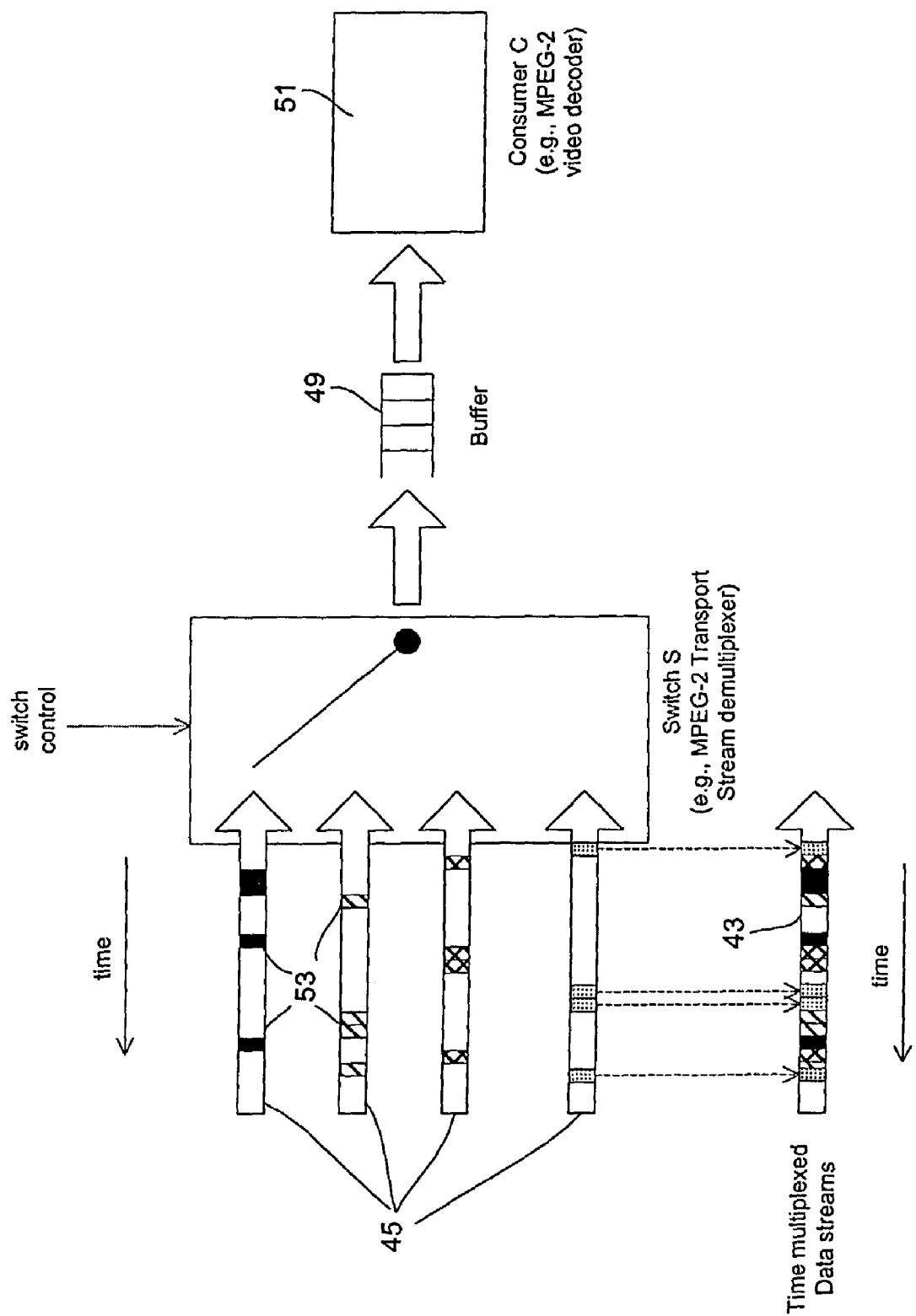
FIG. 2 shows an example of a time-multiplexed data stream.

A further illustration of time-multiplexing different data streams is depicted in FIG. 2. This figure shows the structure of the actual single multiplexed stream 43 that contains data from a number of different data streams 45, multiplexed together. As can be seen, in this situation, only one data element 53 from one stream enters the switch at any moment in time.

Note that the present invention is not limited to situations of time-multiplexed data. However, time-multiplexed data is a particular attractive situation for which this invention is applicable.

Also, the way MPEG video is encoded makes it necessary to switch at the start of a video sequence, because otherwise the receiver has to wait for the start of the next sequence (for example, wait for the next I-Frame, which can easily take a few hundreds of milliseconds). A similar problem exists for audio, where if packets are missed, the audio sequence may be able to recover, but not without causing very audible switching artifacts.

All this makes the exact moment of switching over very critical, while there is no information embedded in the transport stream to find out what is being received in relation to the presentation time. The latency of the (software and hardware in the) receiver processing system is also too big to react on what is being received without knowing ahead of time what will be coming. The conclusion can be that without the proper preparation of the transport stream to give the receiver time to react, the results of a switch between streams will be non-deterministic.

Figure 3:
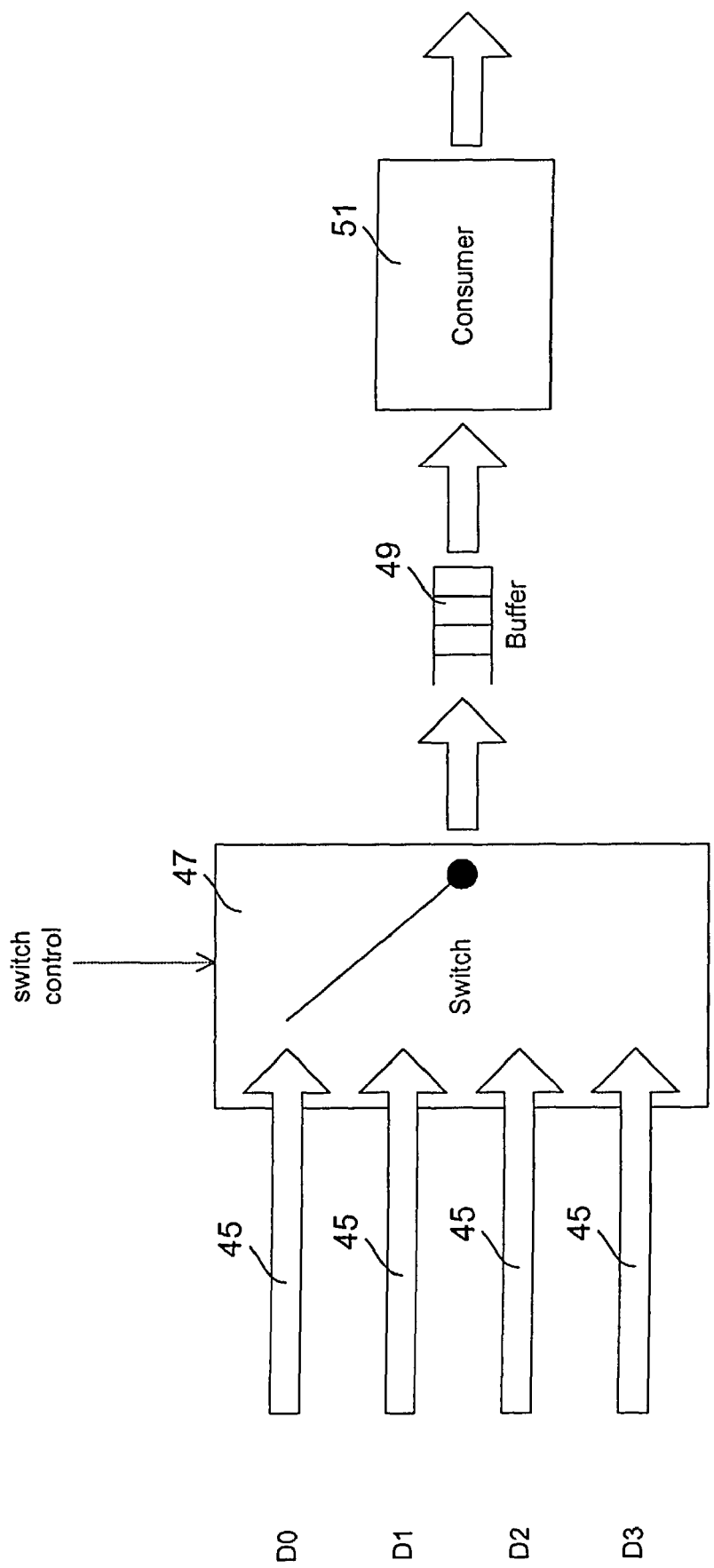
FIG. 3 is a block diagram showing a switch receiving multiple digital data streams.

Consider the general situation depicted in FIG. 3, in which a plurality of digital datastreams 45 are received simultaneously by a switch 47. The datastreams 45 can originate from any type of source (e.g., a digital television broadcast, a storage system such as a hard disk, a DVD disk, a computer network, etc.). The data streams 45 can have varying datarates (the amount of data they contain over a period of time). The datarate per stream can even vary over time (example: VBRVariable BitRate, or VBR, encoded MPEG-2 video). Sometimes a stream might not contain data at all for a certain period of time. The plurality of data streams can be provided to switch 47 in a variety of ways, for example time-multiplexed together (as in MPEG-2 digital television signals, usually together with other content data streams not here depicted). Another option is frequency multiplexing. Yet another option might be provision via separate physical channels.

The switch 47 can be programmed (for example, by external control software) to receive data from one of the incoming datastreams, and place it in a buffer 49 which has a limited capacity. It is important to note that the switch 47 can only receive data from one of the incoming data streams 45 at the same time. The switch 49 can be implemented in a variety to ways, entirely in software, entirely in hardware, or a combination of the two.

Consumer 51 subsequently takes varying amounts of data from buffer 49 at defined moments in time (e.g., each time a video frame must be decoded, it takes the data for the next frame from the buffer). The plurality of datastreams 45 is generated such that continuous selection of the data from any stream by the switch (after a certain small amount of start-up and initialization time) leads to neither under nor overflow of the buffer 49 given the known behavior of consumer 51.

Figure 1:
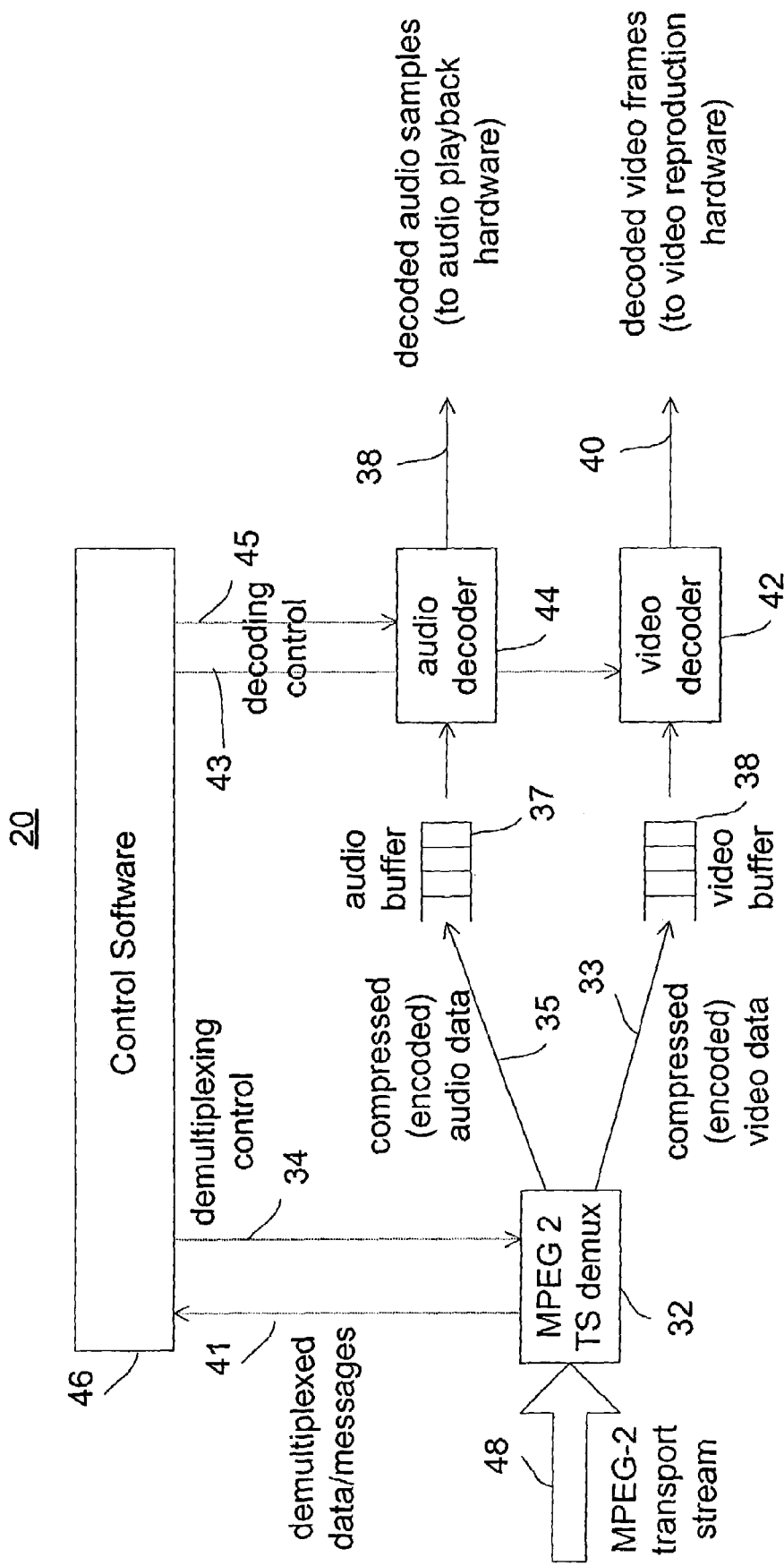
FIG. 1 is a block diagram of an illustrative embodiment showing a digital switch for a digital television receiver.

An example of the general situation depicted in FIG. 2 is the digital television receiver as depicted in FIG. 1. An MPEG-2 transport stream (TS) 48 enters the demultiplexer 32. The MPEG-2 TS 48 contains a variety of different digital datastreams 45, together time-multiplexed in this one single digital transport stream. The demultiplexer 32 essentially is a set of separate switches, controlled from software. In typical modem-day digital television receivers there are two dedicated switches, one for audio and one for video, capable of selecting one video stream 33 and one audio stream 35 from the potentially many audio and video streams contained in the transport stream 48. These streams are forwarded to the dedicated audio decoder 44 and video decoder 42 via audio decoder buffer 37 and video decoder buffer 38. The audio and video decoders produce decoded audio and video ready for presentation, for example, on the screen/speakers. The decoders remove data from the buffers 37 and 39 at defined moments in time.

Other switches in the demux 32 are responsible for selecting other, typically low-bandwidth, datastreams, and forwarding their contents 41 to the control software 46.

In MPEG video, the behavior of the video buffer and decoder is modeled using the VBV model, that specifies how individual video streams, before multiplexing, must be constructed to avoid buffer under or overflows in the video decoder buffer. Furthermore, the MPEG standards model the behavior of demultiplexer and decoders together in the T-STD model, that describes how individual data streams must be multiplexed into an MPEG-2 transport stream to avoid decoder underflows or overflows.

Existing digital television encoders and multiplexers are build to ensure that single data streams, when played, will provide continuous, smooth, presentation. Once the switch has selected a channel/datastream to play from (and after start-up), playback from that channel will be smooth until a switch is made.

Figure 4:
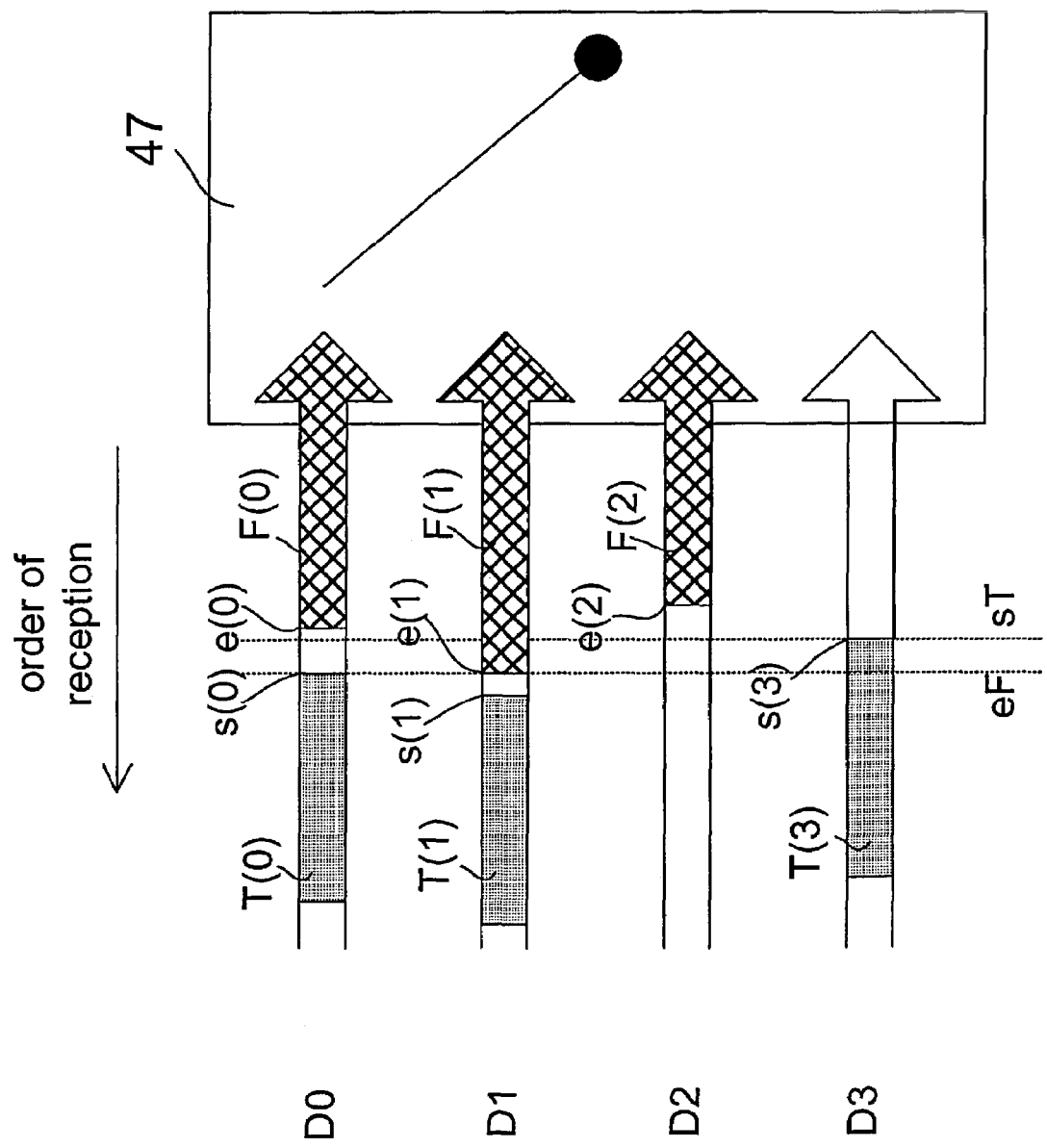
FIG. 4 illustrates a switch receiving multiple digital data streams, where each data stream is split into separate segments.

Now consider the situation depicted in FIG. 4, where the data streams as introduced in FIG. 3 are split-up into segments. Shown in FIG. 4 is a group of 'From' segments {F(0), F(1), F(2)} and a group of 'To' segments {T(0), T(1), T(3)}. These segments are sequences of data constructed such that Consumer 51 (not shown) can provide seamless presentation of any of the 'From' segments followed by any one of the 'To' segments. In the case that the segments are MPEG video, for example, it is required that each such segment starts with an I frame, and ends with a closed GOP (Group of Pictures), meaning that there is no dependence on data coming after it in the same data stream. Furthermore, all segments have to be multiplexed relative to the same clock (for example, the so-called PCR in MPEG-2 transport streams). Also, all last frames (in presentation order) in the set of 'from' segments must have an identical presentation time. Finally, all first frames (again, in presentation order) in the 'to' segments must have an identical presentation time, which is one frame time later than the presentation time of the last frame in the 'from' segments. Together, if all these requirements are satisfied it means that, independent from what stream is being decoded, a switch is in principle possible.

The pair of 'From' segments and 'To' segments essentially defines a switch point, where a transition between data streams is possible without interruption. One particularly interesting utility of such switch points is the ability to create different storylines for different end-viewers by choosing different sequences of segments. Switch points are the locations where a 'safe' transition (or cross-over) between data streams can be made, both from a technical and creative viewpoint.

Playback by the consumer 51 (not shown) can obviously only be seamless under the provision that during the switch no data is lost and no extra data is introduced, and that the buffer 49 (not shown) is neither underflowing (insufficient data is present in the buffer when needed by the consumer, so the presentation has to be interrupted) nor overflowing (the buffer is full, so switch 47 would have to discard data).

However, during the transmission and multiplexing of different datastreams, generally no attention is paid to the synchronization of data between the different streams, since these are normally independent from each other. In normal broadcast television, the viewer is intended to watch one data stream, and when changing channels, a hiccup in presentation is allowed since the new program is a completely different program anyway. It is clear, however, that preparing the data streams independent from each other, as is done today, will not allow for a seamless transition. The present invention will disclose a series of methods to prepare the plurality of data streams such to obtain seamless switches between segments in the data streams.

In FIG. 4 shows the situation where the data from 'From' segments F(0), F(1), and F(2) is currently entering the switch. The last data elements of each of these segments potentially enter the switch at slightly different moments in time e(0), e(1), and e(2) respectively, e.g., because of time multiplexing of the data. A set of new segments T(0), T(1), T(3) is coming up. The first data elements of each of the 'To' segments is entering the switch at time s(0), . . . s(N) s(1), and s(3) respectively. The intention is that any switch from any of the 'From' segments can be made to any of the 'To' segments. However, using conventional multiplexing techniques it might well be that some of the 'To' segments start slightly (e.g., a few transport stream packets in MPEG-2) before some of 'From' segments are ended, since these are multiplexed independent from each other. Normally there would be no reason to have any synchronization between the segments in different, fully independent, data streams.

However, to be at all able to make a seamless switch from any of the 'from' segments to any of the 'to' segments, and under the assumption that the switch cannot receive/buffer data from more than one data stream, the first data belonging to any of the 'to' segments cannot arrive at the switch earlier in time than the last data belonging to any of the 'from' segments.

Figure 5:
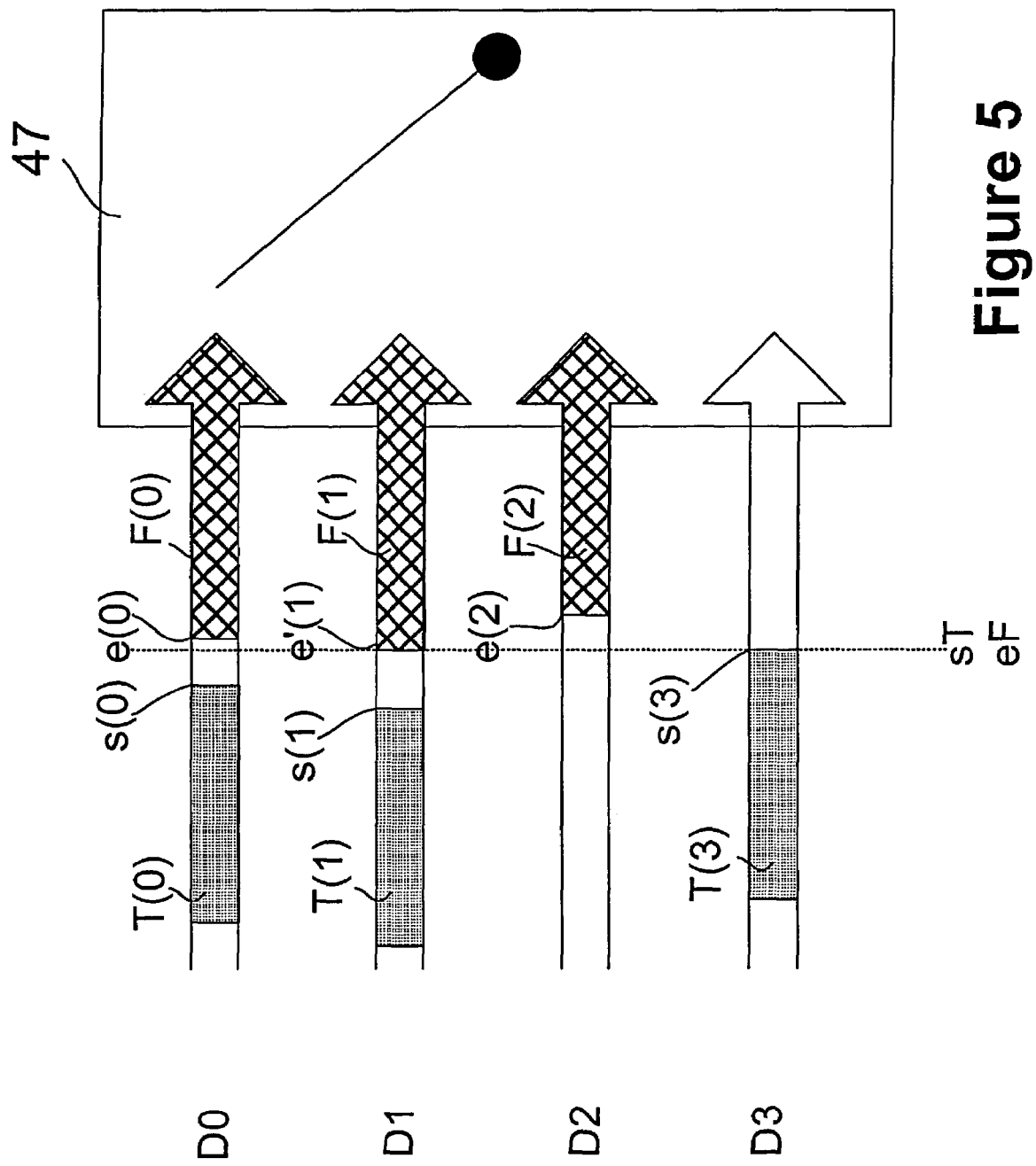
FIG. 5 illustrates a switch receiving multiple segmented digital data streams, where the start and end times of the segments are synchronized.

FIG. 5 shows the desired situation where the 'From' segments all end before any of the 'To' segments start. The multiplexer that produced this particular stream has now taken into account that the start and end positions of segments across data streams must be synchronized.

Figure 6:
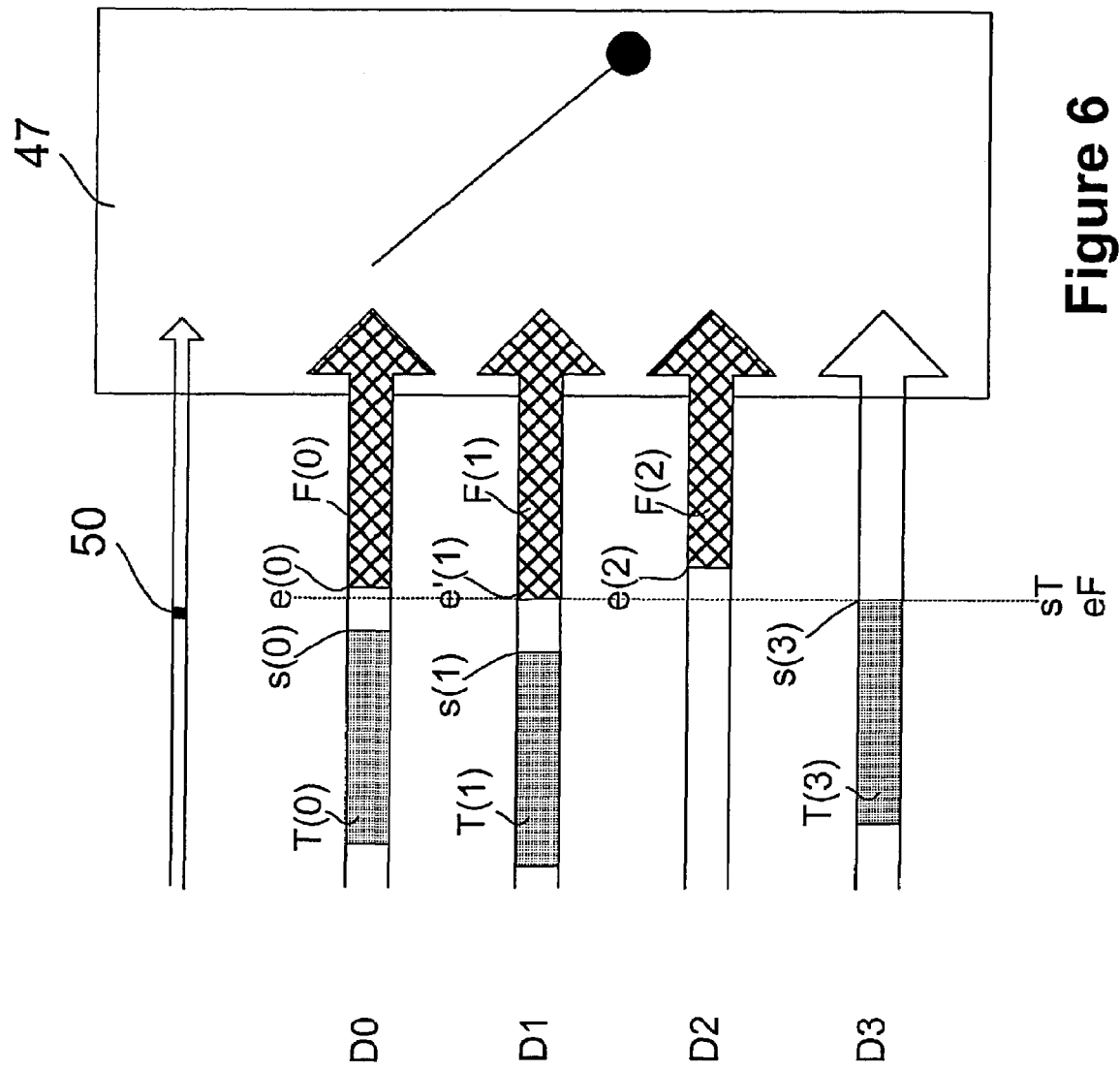
FIG. 6 illustrates a switch receiving multiple synchronized segmented digital data streams, including a separate control stream providing switch trigger messages.

Another important requirement for a seamless switch is ensuring that no erroneous data flows into the buffers and/or decoders. For example, suppose that it is desirable in the situation of FIG. 5 to play segment T(1) after F(0). Now suppose that switch 47 would switch directly after the end of segment F(0) to the data stream containing segment T(1). If the switch would be made too fast, this could mean that some of the last data of segment F(1) would flow into buffer 49 (not depicted), since segment F(1) ends after segment F(0). This obviously is undesirable. One way to solve this problem is distributing all segments over their own (private) data streams, but this is wasteful in the amount of data streams needed. A better option is using a dedicated 'trigger' message that tells the receiver when it is safe to make the switch. It is important to note that the switch should also not be made too late, since then data from the next segment might be lost. Therefore the trigger message must preferably enter the switch directly after the last data element of the latest ending 'From' segment (in the example, F(1)) has been consumed by the switch. Such a trigger can be transmitted on a separate channel which is time synchronized with the other channels, or it can be contained in each of the data streams itself at the appropriate time (in the form of a data packet without actual data to be used by the consumer e.g., MPEG user data or an MPEG splice point). The situation with a trigger message on a separate channel is depicted in FIG. 6. The message appears on the separate control channel directly after the last data of the last ending option to not lose time.

In general, a certain amount of time goes by between detection of the just described trigger message and the actual switching of the switch to the new data stream. Even when the trigger message is received in time, the receiver software needs a certain non-zero amount of time to react on receipt of the trigger message by the switch (usually via an interrupt routine), and instruct the switch to switch (usually via device drivers).

Figure 7:
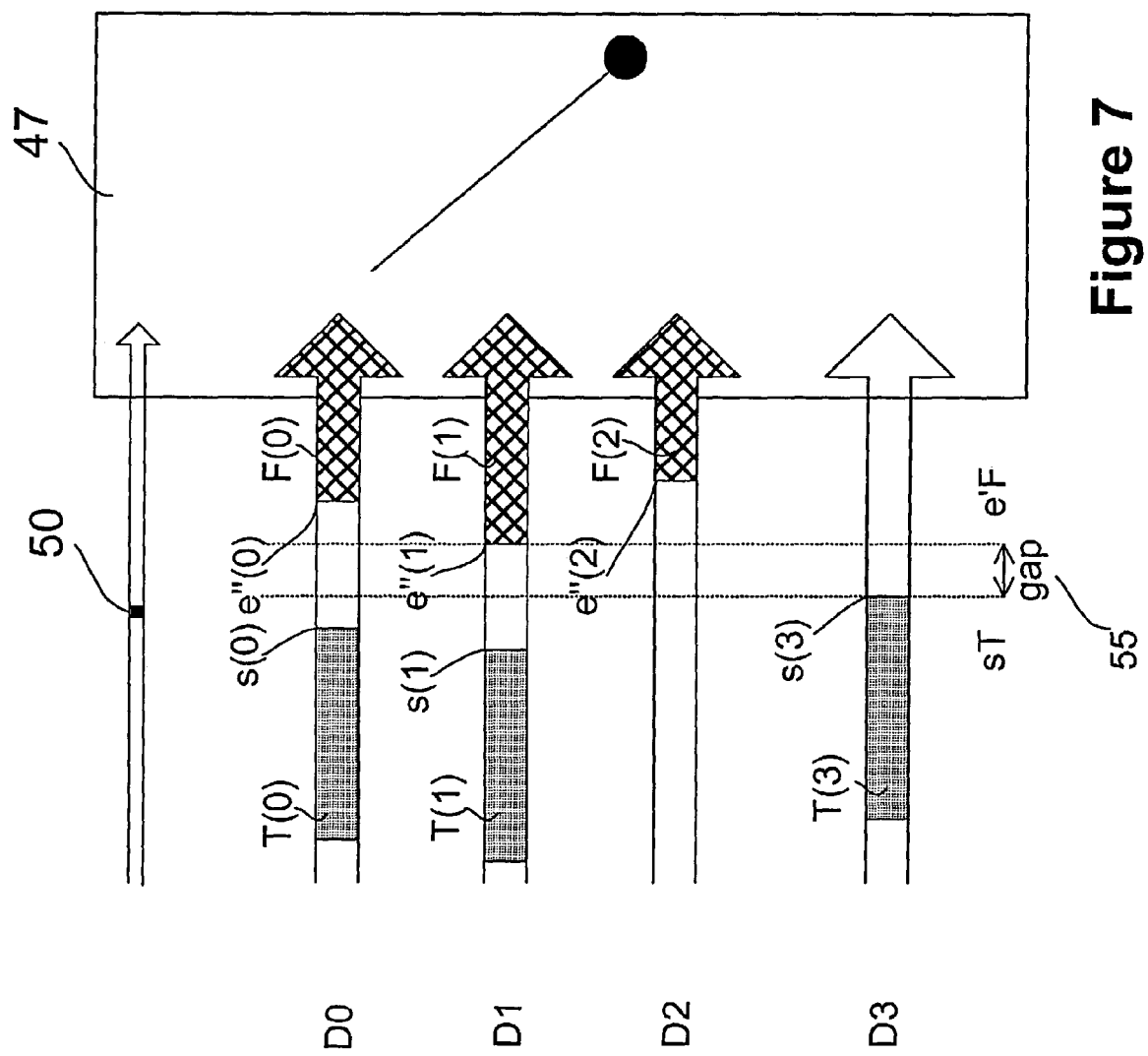
FIG. 7 illustrates a switch receiving multiple synchronized segmented digital data streams, including a separate control stream providing switch trigger messages, where the segments are separated by means a of a 'switch gap'.

The present invention also includes the introduction of so-called 'switch gaps' 55, as shown in FIG. 7, between synchronized segments in the channels data streams between which a switch can be made. A switch gap 55 typically is a period of 'no data' (or silence) on those channels data streams.

Switch gaps 55 can be introduced by exploiting the presence of buffer 49 located after the switch. By temporarily filling this buffer more than normal, the 'From' segments can all end earlier than normal, thus creating the switch gaps. All data in the segments will still be transmitted, it will just arrive at the receiver earlier, and it will sit in the buffer longer. Essentially this means that the data for each 'From' segment F will be transmitted earlier than normal, thus creating the gap.

Note that an alternative method for creating gaps is delaying the start of the 'To' segments. However, this usually leads to buffer underflows in buffer 49. The only real way to avoid such underflows is starting the 'To' segments at the usual time and ending the 'From' segments earlier than usual by transmitting more data than usual. Although transmitting more data on the data streams will lead to a higher bandwidth this is in general no problem since transmission channels such as MPEG-2 transport streams have spare bandwidth available (e.g., in the form of NULL packets) to cover bursts of data.

The required size of the gap is the maximum time needed for the receiver to switch, and depends on the hardware and software of the receiver. In the case of STB (set top box) receivers, the gap timing may vary based on the brand of STB. The gap size should typically be chosen to accommodate the slowest switching time of a set of different STBs deployed in a particular distribution network (such as a cable system). Experiments have shown that a typical digital television receiver will require a switch gap of around 30 msec., with 50 msec being a realistic maximum.

Various options for increasing the bandwidth to create the switchgaps exist. One issue that arises when creating gaps in MPEG-2 transport streams is that it is not legal to burst too much data in a short time into either the audio or video buffers. There are clear rules stated in the MPEG specification (more specifically, the section on the T-STD decoder model), which govern how fast video, and audio data can be sent. These rules concern a small 512-byte receiving buffer known as the transport buffer. Assuming a 27-megabit transport stream, for instance, video packets have to occupy on average not more than two out of every three packets in the stream. Audio can only occupy on average about one out of every 14 packets. Thus it is not sufficient to simply move gap data close together slightly before the gap. The transmission pattern of the moved data must obey the transport buffer rate rules.

Given this consideration, one particularly attractive option to creating the switch gap is spreading out the increase in data over the entire duration of a segment (i.e., slightly increasing the datarate of the entire segment), since this strategy evenly distributes the gap data over the segment, thus eliminating the risk for transport buffer overflows. For instance, suppose we have a 3-second video segment encoded at 4000000 bits per second, but it is desired to create a 30-millisecond gap before the next segment starts. This 3 second segment will, in the normal case, also take 3 seconds to transmit at the bitrate of 4000000 bits per second. Now, by instead transmitting the segment at a bitrate of 4040000 bits per second instead of 4000000 bits per second, the 30 msec. gap (4000000*0.03/8=approx. 15000 bytes of data) is automatically created at the end of transmission of this segment. This form of gap creation has the mentioned benefit of distributing the buildup of the extra gap data over the entire length of the segment, and so avoiding the creation of a bandwidth bottleneck just before the gap. Other options for creating the gap are variations of this general scheme, such as only increasing the bitrate from a certain point in the segment. This strategy is attractive in situations of live/online encoding/multiplexing, where it is initially not known when a segment will end.

The person skilled in the art can see that existing MPEG-2 multiplexers can easily be extended to multiplex individual data streams according to the methods just described (i.e., synchronizing start and end of individual segments with a switch gap in between them, multiplexing data at slightly datarates than the data actually has, and insertion of trigger messages at the right time).

Furthermore, those skilled in the art can easily see that this model can be generalized, for example to a situation with multiple switches, etc. (for example, such as a digital set-top box with both audio and video switching). The number of parallel streams at the switch point does not matter, thus the present invention can be scaled up to any number of streams and provides the method to create multi-directional seamless switch point.

Although described mainly in terms of MPEG-2 transport streams, the present invention will work with any type of multiplexed data streams, such as SMPTE360-M, MPEG-1 Systems, MPEG-2 Program streams, MPEG-4 systems, in any situation wherein some control is provided over the data stream rates and a buffer is provided after the switch and before the actual users (decoders) of the data,. By utilizing the independence between reception and presentation, the present invention introduces a discontinuity in the transmission of all streams and thus creates an opportunity to switch without loss of data or introduction of unwanted data.

The creation of switch gaps by sending data early has consequences for the encoding of the segments in the data streams when these segments are MPEG video (whether MPEG 1, MPEG 2, MPEG 4, or any variation thereof). The creation of gaps must still result in a stream that is compliant with the MPEG buffer models, such as the VBV and T-STD models. This section discloses an illustrative embodiment of an encoding method that allows for such compliance in the presence of switch gaps.

When the segments in the datastreams are MPEG-encoded video, specific precautions must be taken to not overflow the decoder buffer located before the actual video decoder. The MPEG video buffer in MPEG decoders/receivers has a fixed size, which can easily lead to overflows of this buffer when sending video data early. Such an overflow leads to discarding of data and consequently undesired playback artifacts.

A typical example of a video buffer size is 224 Kbyte as used for decoding MPEG-2 MP@ML video (used in virtually all consumer digital set-top boxes). For different profiles/levels/versions of MPEG, different buffer sizes exist, but the basic principle is the same.

While encoding a video segment, the video encoder takes the maximum buffer size into account, and ensures that it never produces output that can overflow that buffer. However, this assumes that the data is entering and leaving the buffer at the normal (encoding) rate, which is lower than the invented higher datarate necessary to create switch gaps.

Figure 9:
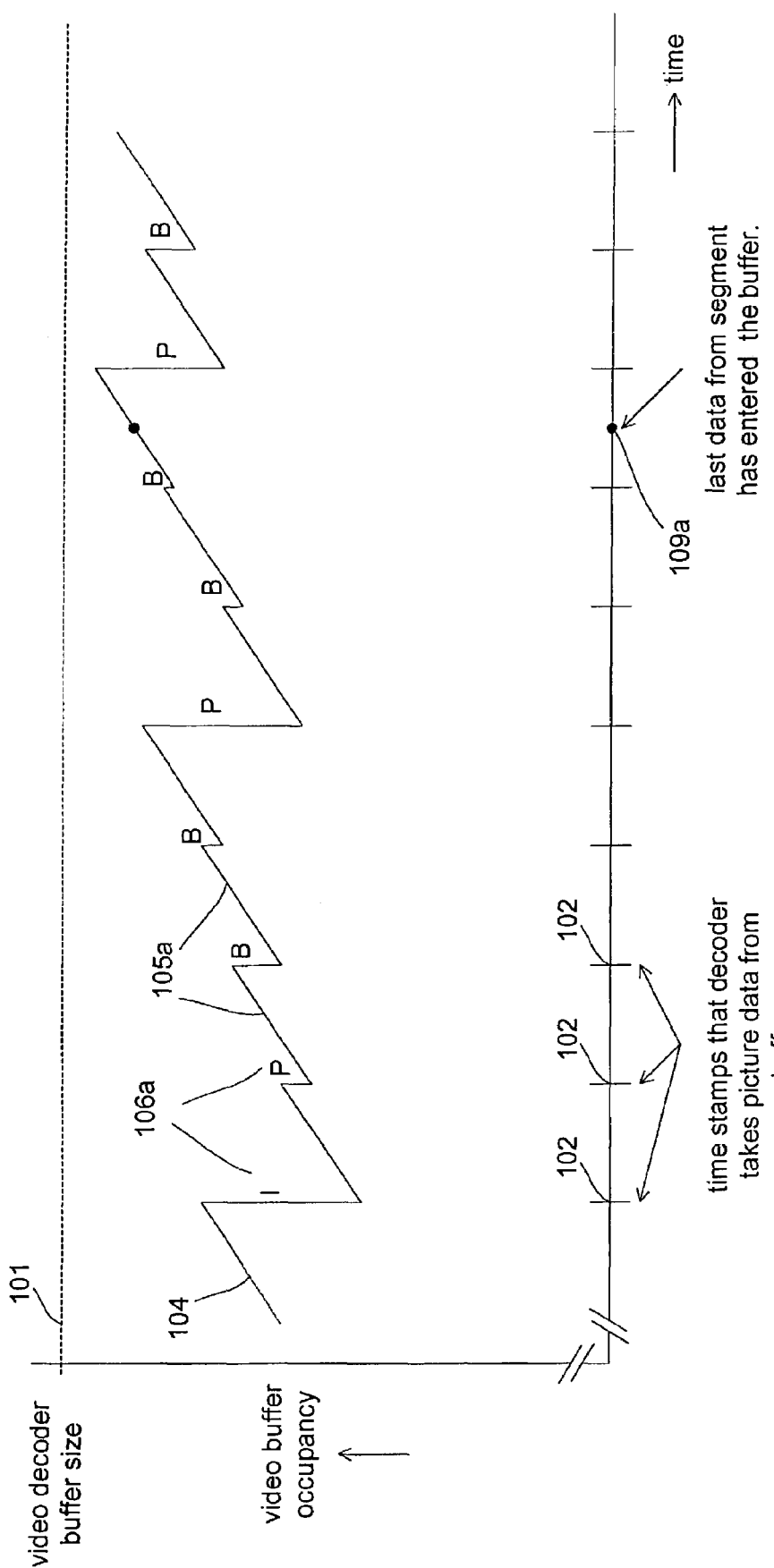
FIG. 9 shows a video buffer occupancy in a normal situation.

FIG. 9 shows an example of the normal buffer fullness over time of an MPEG video decoder buffer ('normal' meaning that video data is not transmitted early). The video is encoded such by the video encoder that at the normal transmission speed (bitrate), the buffers will not overflow. The transmission speed (buffer fill rate) is visible in the angle of the up-slopes, such as 105*a*, in the graph. Picture data is taken out of the buffer at defined moments in time 102, and subsequently decoded (for example, for interlaced PAL and NTSC video, frames are taken out of the buffer typically 25 resp. 29.97 times per second).

MPEG video encoders will guarantee that the buffer level will always stay below the defined maximum 101, assuming a normal transmission rate. As can be seen, the buffer fullness varies considerably over time, depending on the size of individual video frames such as the I and P frames 106*a*. Frame sizes are allocated by a video encoder as part of its rate control algorithm. Typically, so-called 'I' (Intra) frames are much bigger than 'B' or 'P' frames.

Figure 10:
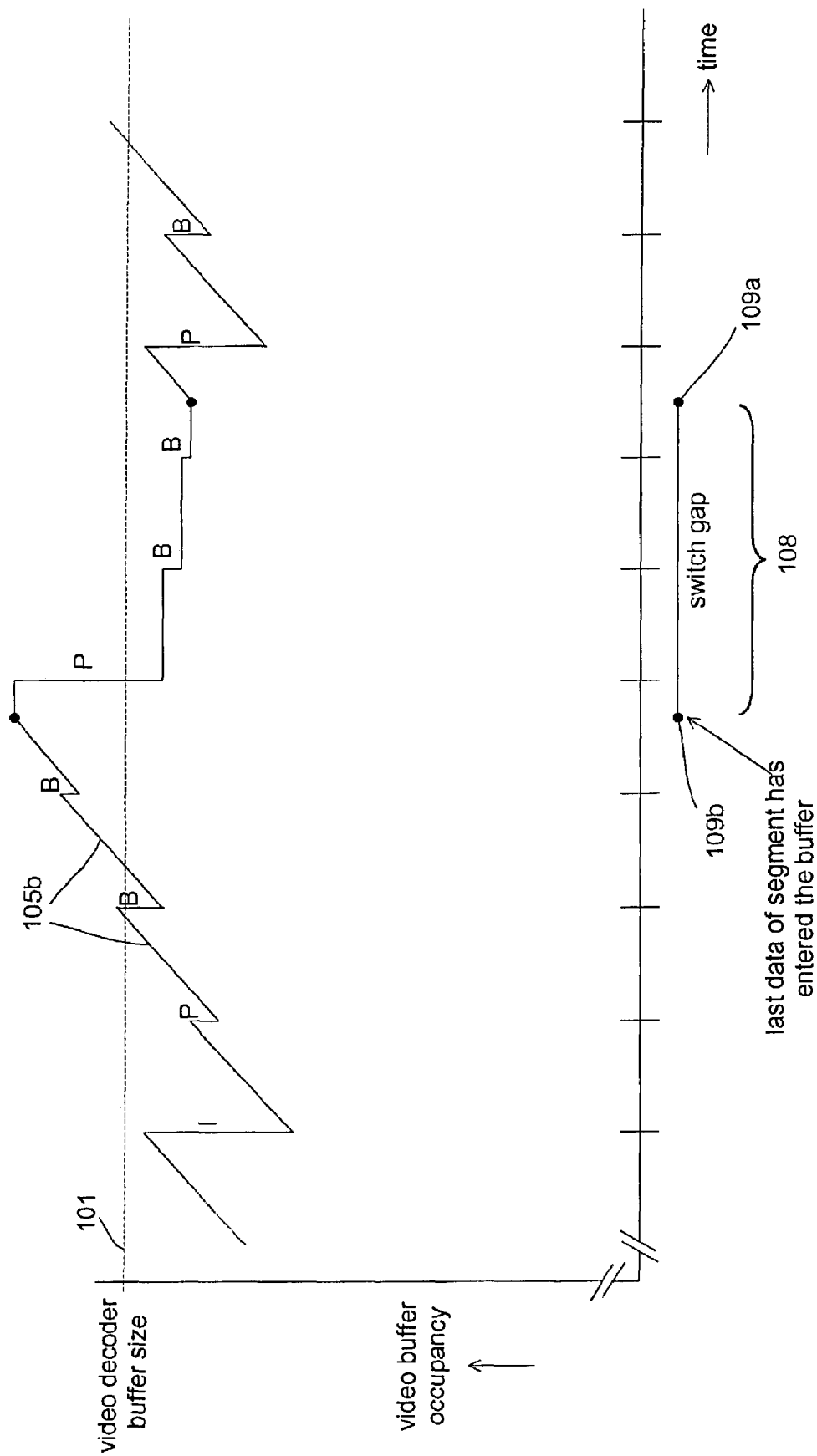
FIG. 10 shows a video buffer occupancy with overflows resulting from increasing the transmission rate of video.

Following the present invention, the data rate of video segments will be increased to create a switch gap 108 as shows in FIG. 10. The time of the last data of the segment entering the buffer has been moved from time 109*a* in FIG. 9 to an earlier time 109*b* in FIG. 10.

The buffer fill rate 105*a* of the video decoder buffer in FIG. 9 will therefore increase to a fill rate 105*b* before time 109*b*, as shown in FIG. 10. As can be seen in the Figure, this leads to buffer overflows since the data is loaded in the buffer earlier than normal. After the gap is finished at time 109*a*, it can be seen that the buffer level in FIG. 10 is back at the same level as it was in FIG. 9 at time 109*a*. From that time 109*a* new data (e.g., for a new segment) starts entering the buffer, most likely again at a higher datarate to create a gap at the end of that new segment, facilitating another seamless switch.

As simple calculation can illustrate how much the buffer can potentially overflow given the amount of data needed to bridge the switchgap. Assume, for example that the video is encoded at a bitrate of 4000 Kilobit/sec. Furthermore, assume that the desired switch gap is 30 msec. In this case the amount of data that has to be moved earlier in time is 0.03*4000/8=15 Kbyte of data. Consequently, the video decoder buffer can overflow as much as 15 Kbyte.

The fundamental reason that the video decoder buffer can overflow in this situation, next to the working assumption of a (normal) transmission rate equal to the bitrate of the video, is the assumption taken by MPEG video encoders that they can make full use of the entire video decoder buffer (e.g., 224 Kbyte for MP@ML video) when making decisions on the sizes of the individual frames.

The present invention includes modifying existing encoders (or instructing existing encoders, in case they have such settings) to assume a (usually slightly) smaller video decoder buffer than actually available. This would lead to different encoding decisions (assigning different amounts of bytes to different frames) to keep the buffer occupancy guaranteed below the new (lower) limit.

Figure 11:
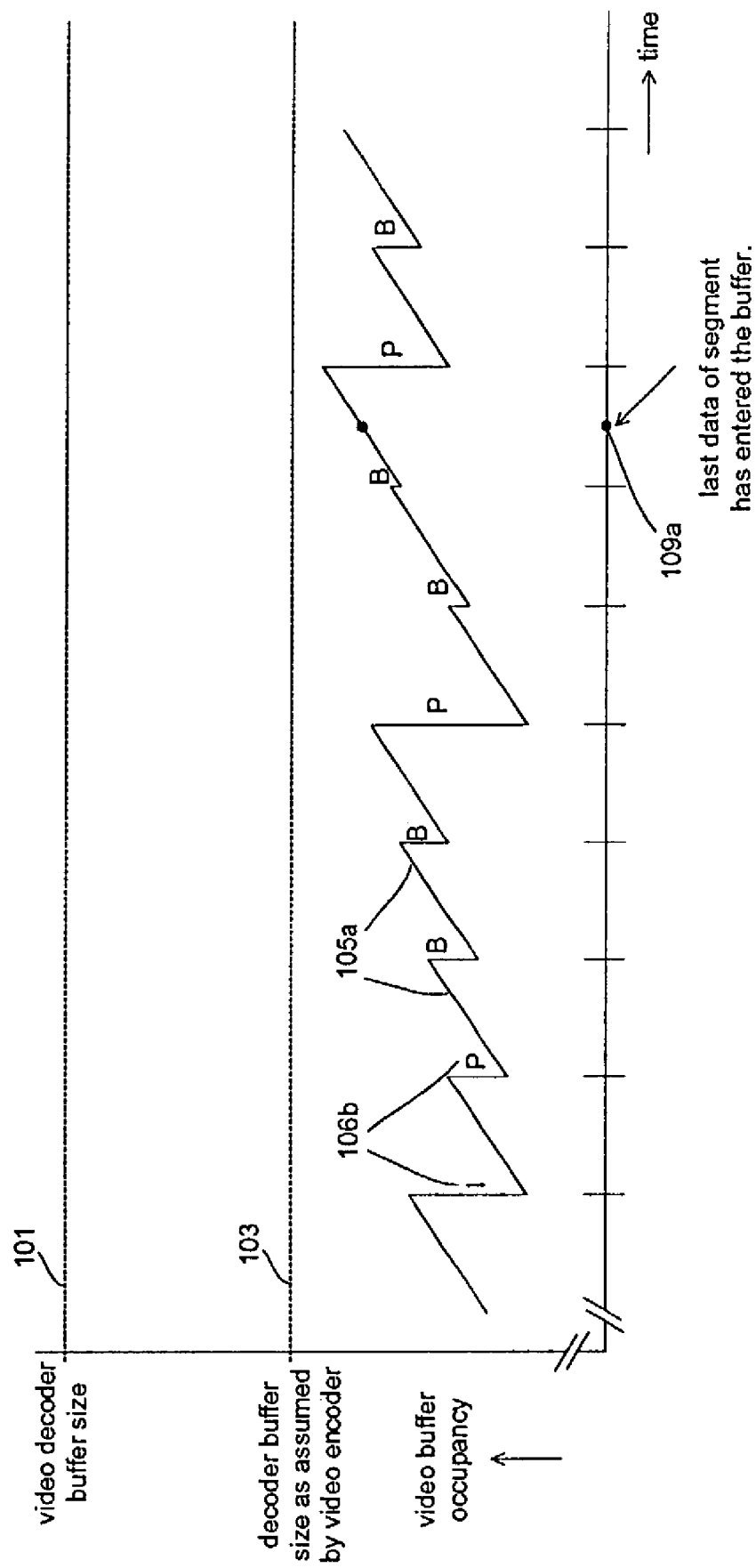
FIG. 11 shows a video buffer occupancy in a normal situation with the video encoder assuming a smaller video decoder buffer size.
Figure 12:
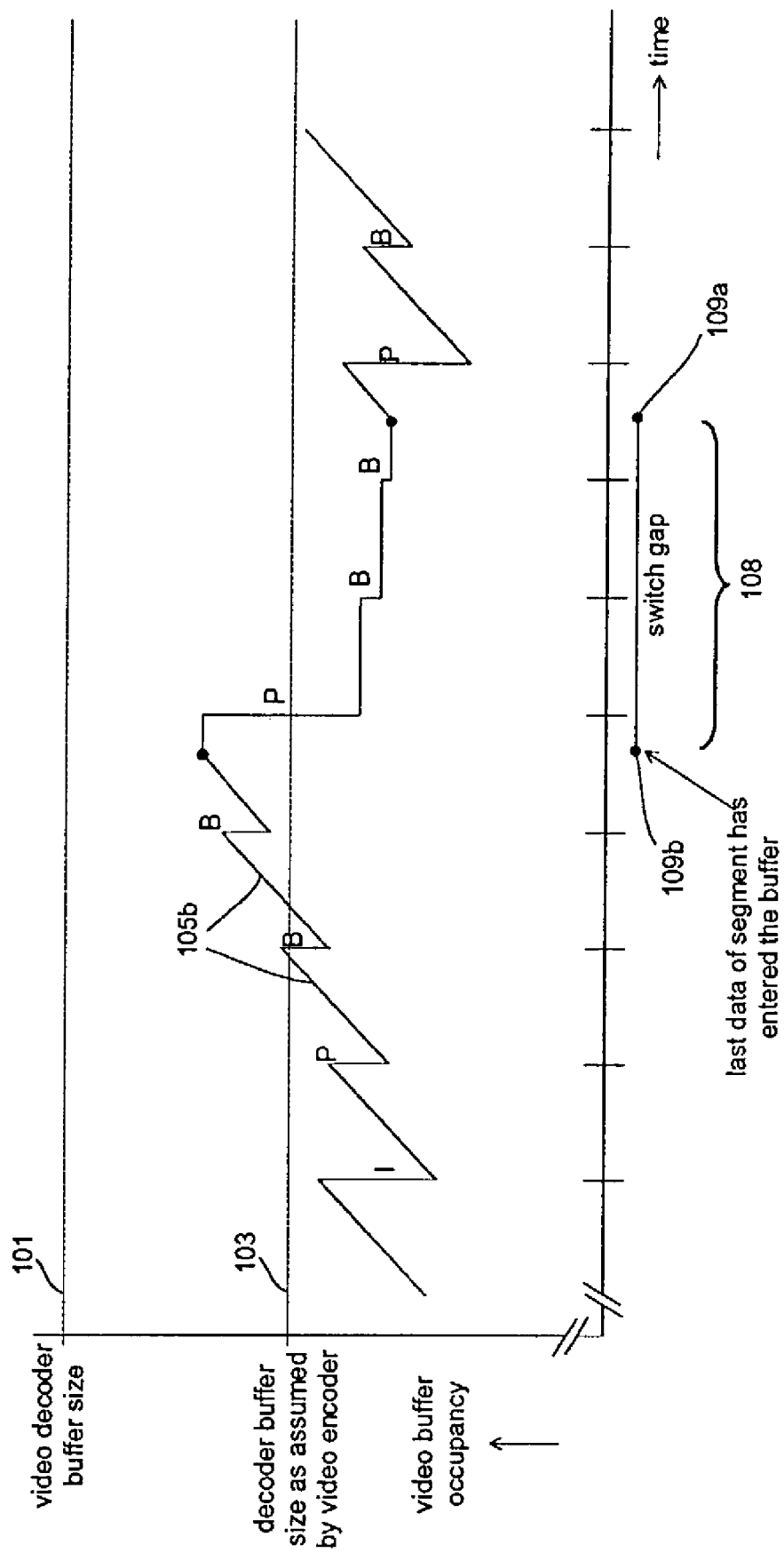
FIG. 12 shows a video buffer occupancy without overflows resulting from increasing the transmission rate of video, encoded with a lower buffer size.

This technique is illustrated in FIG. 11. This Figure shows the same video as in FIG. 9, however now encoded with a reduced maximum buffer size 103 (e.g., 15 Kbyte less for 4 Mbps video and a desired gap of 30 msec.). As can be seen, some of the frames 106*b* have a different size compared to the same frames 106*a* in FIG. 9, which is a result of decisions by the encoder to ensure that the buffer occupancy always stays below the defined (lowered) maximum size. FIG. 12 shows the video from FIG. 11 after the switch gap 108 has been created by. transmitting the video data earlier. As can be seen, the maximum buffer level now exceeds the maximum buffer level 103 as instructed to the video encoder, but it stays below the actual real maximum buffer size 101. Thus, no overflows of the actual video decoder buffer will occur.

Another situation where encoding video with a slightly lower than real target decoder buffer size is useful is to ensure that two separately encoded video segments can be correctly played in sequence without running the risk of temporary buffer overflow. A state-of-the-art video encoder allocates bytes to individual video frames such that, given the bitrate with which the video is encoded (the angle of the slopes 105 in the buffer graphs), the buffer does not overflow. However, when encoding individual segments, at the end of each such segment the encoder may assume that no more data is flowing into the buffer (only the remaining data is taken out of it). In such a case, the buffer might be very full until the very last frame is taken out of it (e.g., a large I frame). If now another video segment starts entering the buffer (e.g., after a created gap), a potential for buffer overflow exists at the beginning of this new data entering the buffer.

One technique to solve this problem is always encoding video with a lower buffer size, which enables streaming in of next segments to be played with a reduced risk of buffer overflow. Another option is adaptive encoding of segments with increasingly smaller buffer sizes, until overflows are avoided. Yet another option is artificially placing extra (dummy) frames after the end of the segment, encode the segment, and then removing the added frames. This tricks the encoder into thinking that more data will follow after the real last frame, and therefore the encoder will not assume that no data will follow and consequently the encoder will not allow the buffer to fill up.

For similar reasons as for video, also for audio certain precautions have to be taken to not overflow or underflow the audio decoder's buffer. However, the situation is not as difficult as with video, since audio frames usually have very similar sizes, and audio can arrive in a decoder just in time, since there are no time dependencies between different audio frames. No specific precautions have to be taken during audio encoding. Instead, a slightly different multiplexing scheme might have to be used.

For example, for MPEG-2 audio a typical buffer size is 3584 bytes while for AC-3 audio it is 2336 bytes. Assuming an audio bitrate of, e.g., 128 Kbps and a required switch gap of 30 msec, this means that at least 492 extra bytes need to be loaded into the audio decoder buffer prior to the switch gap.

Figure 13:
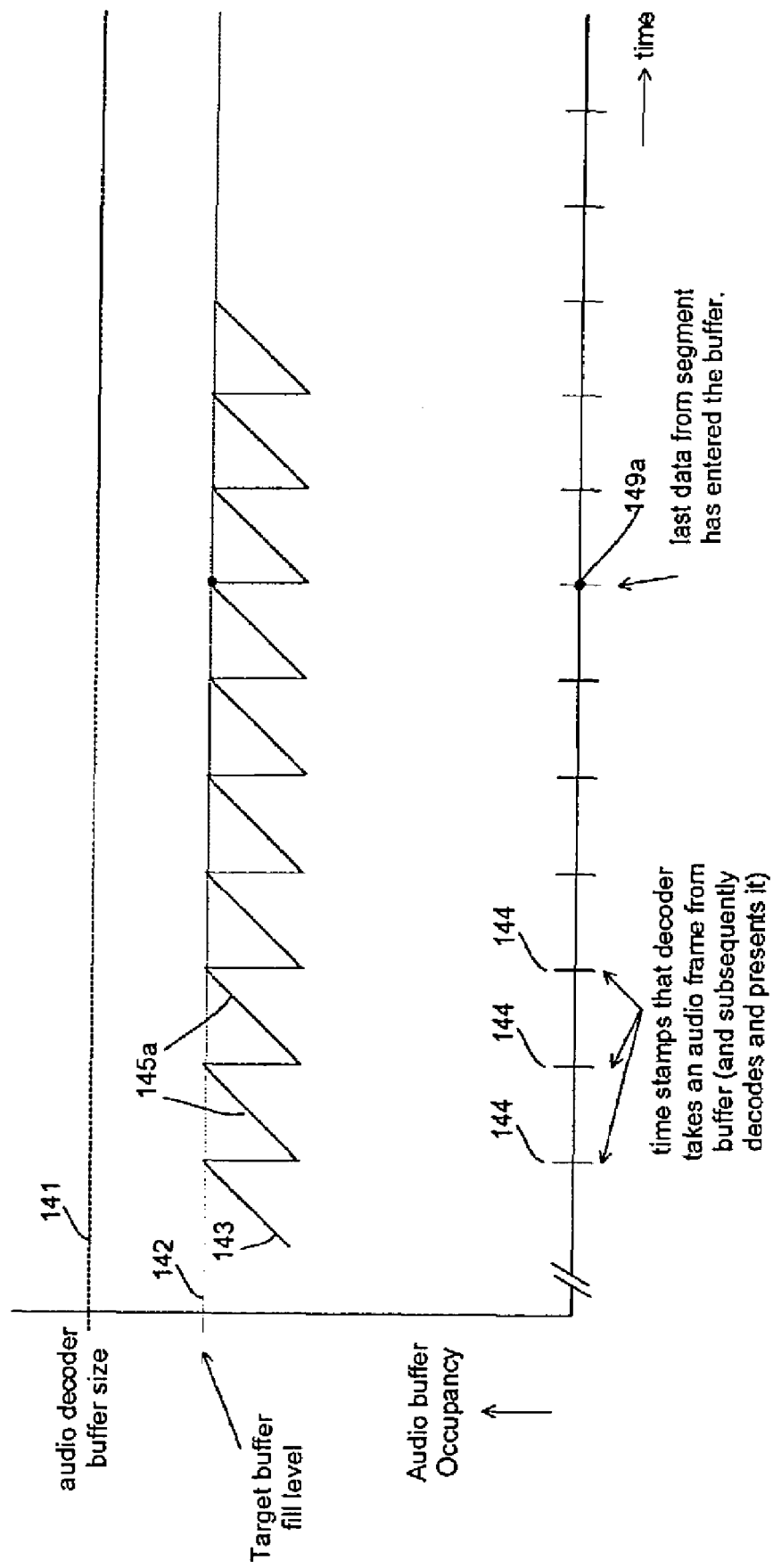
FIG. 13 shows an audio buffer occupancy in a normal situation.

Normally, when multiplexing audio, a multiplexer has to decide what the target maximum buffer fullness level of the audio decoder buffer is (i.e., how many frames to keep in this buffer on average). For example, FIG. 13 shows the audio buffer occupancy over time where the multiplexer has decided to keep the audio buffer rather full at a max level 142*a*. Audio frames are taken out of the buffer at defined moments 144. Audio is transmitted at its normal encoding bitrate, indicated by the slopes 145*a*.

Figure 14:
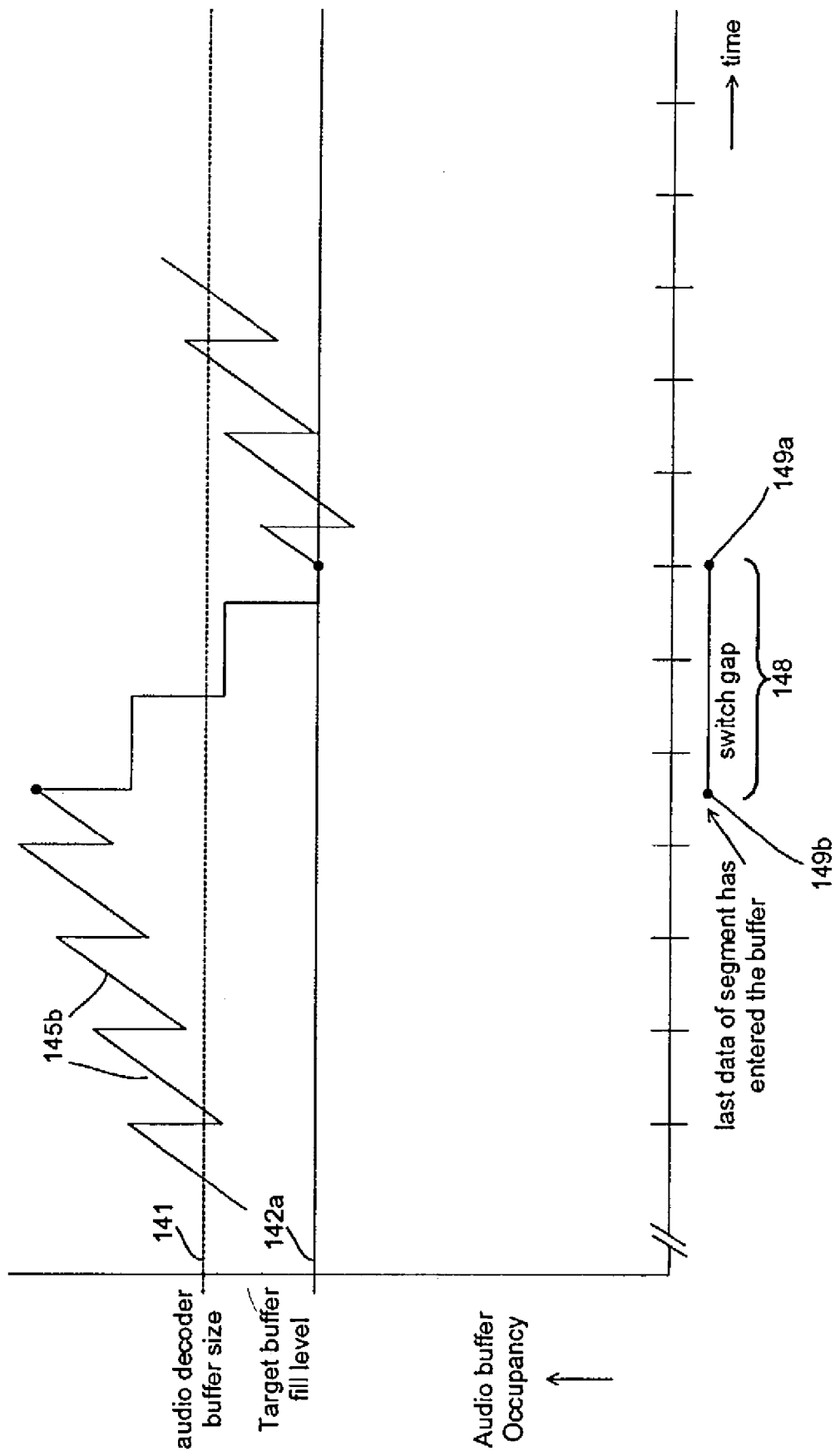
FIG. 14 shows an audio buffer occupancy with overflows resulting from increasing the transmission rate of audio.

Creation of a switch gap will lead to buffer overflows as shown in FIG. 14. Audio is transmitted at a slightly higher than normal bitrate 145, leading to the indicated overflow just before the switch gap 148. The problem is that the target bitrate 142*a* is too high. Note that the buffer occupancy is back at this target bitrate after the switch gap has been passed.

An illustrative embodiment that addresses this problem is instructing the multiplexer (or slightly modify an existing multiplexer) to keep the target audio buffer occupancy lower than normal, e.g., using a strategy as depicted in FIG. 15. By choosing a low normal buffer fullness level 142*b* (reached just before a frame is taken out of the buffer), the multiplexer now has space to insert audio segment with a slightly higher bitrate without exceeding buffer limits. The maximum allowed target buffer fullness can easily be computed from the normal buffer size, the audio bitrate, and the desired switch gap. Given the above example of 128 Kbps encoded audio, a desired switch gap of 30 msec, and a normal audio AC-3 decoder buffer of 2336 bytes, the target buffer full level can be at most 2336−492=1844 bytes.

An illustrative embodiment for the transport stream generation device and multi-direction seamless switching is the personalization of TV commercials in a digital television environment. In this application a personalized commercial would consist of several sequential time windows (slots), each having several parallel options. All options for a slot would be transmitted simultaneously within the same transport stream and, at the beginning of each slot, a decision would be made by the receiver which of the options for this slot to show to the viewer. The personalized advertisement would be either inserted into the flow of the main program in a time slot that would be big enough for the total personalized ad (typically 30 seconds), or it would be inserted in a entirely different transport stream, requiring the receiver to temporarily switch to that different transport stream for the duration of the personalized commercial.

Figure 8:
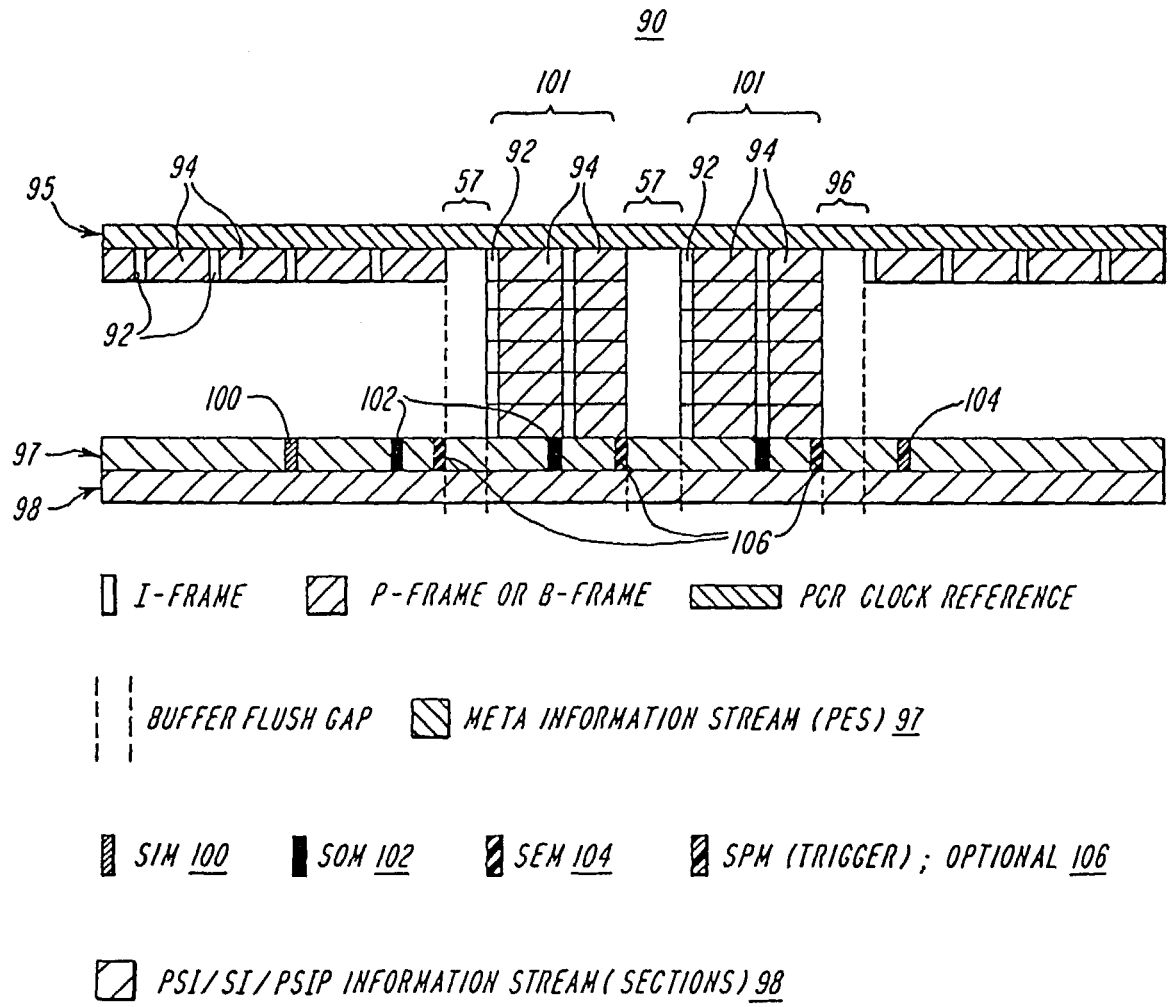
FIG. 8 shows a transport stream with a personalized message according to an illustrative embodiment.

FIG. 8 shows a transport stream 90 prepared according to an embodiment of the present invention. In this case content selection information has been added by the personalization application. It consists of the indicated SIM (Sequence Identification Message, indicating the start of the message) 100, SOM (Sequence Option Message, indicating that a switch point is coming up, based on which the received will decide on the next option to play) 102 and SEM (Sequence End Message) 104, while the switch point trigger message is indicated by the SPM message 106. In this example the personalized ad comprises two segments 101, which have multiple choices of media data, and are preceded by gaps 57 to allow for switching time to an appropriate media data segment. The transport stream 90 shown indicates a personalized ad inserted into a main program.

It will understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method of preparing a plurality of digital data streams, each data stream comprising multiple segments, said plurality of digital data streams to be received by a switching device, said switching device including a buffer with a predetermined capacity, said method comprising the steps of:
    encoding said segments for transmission to said switching device at a selected data transfer rate, wherein said step of encoding said segments is performed based on a buffer capacity value that is less than said predetermined capacity of said buffer of said switching device; and
    multiplexing said segments at said selected data transfer rates, wherein said encoded segments include synchronized start and end points in said plurality of digital data streams and wherein said step of multiplexing said encoded segments is performed at a second data transfer rate that is higher than said selected data transfer rate.

2. The method of claim 1 wherein said step of multiplexing said encoded segments at a second data transfer rate that is higher than said selected data transfer rate is performed for an entire duration of said encoded segments.

3. The method of claim 1 wherein said step of multiplexing said encoded streams at a second data transfer rate that is higher than said selected data transfer rate is performed for a portion of said encoded segments.

4. The method of claim 1 including the steps of:
    appending additional data to said segments;
    encoding said segments that include the appended additional data; and
    removing said encoded additional data from said encoded segments.

5. The method of claim 1, wherein said segments include MPEG encoded data streams.

6. The method of claim 5, wherein said segments are multiplexed in an MPEG transport stream.

7. The method of claim 1, wherein said plurality of digital media streams include AC-3 encoded data streams.

8. The method of claim 1, wherein a gap is created following said synchronized end points.

9. The method of claim 1 wherein said segments are digital audio streams, and wherein said multiplexing of said encoded streams includes multiplexing at a buffer capacity value lower than said predetermined capacity of said buffer.

10. The method of claim 1 wherein said switching device buffer is an MPEG VBV buffer or a video decoding buffer in a set-top box.

11. The method of claim 1 wherein said switching device is a device capable of decoding MPEG-2 streams; a digital set-top box; a digital TV set; a Video-On-Demand Server; or a DVD player.

12. A system for creating an MPEG transport stream from a plurality of digital data segments, wherein said digital data segments have synchronized end points with respect to each other, and wherein said MPEG transport stream will be received by a switching device with a buffer, comprising:
    a frame encoder to receive said plurality of digital data segments and encode said digital data segments into frame encoded segments, wherein said frame encoder encodes said digital data segments based on a selected capacity of said buffer;
    a multiplexer coupled to said frame encoder to receive said frame encoded segments and create said MPEG transport stream, wherein said multiplexer adjusts a data rate of said frame encoded segments in said MPEG transport stream to allow a gap after said digital data segments with synchronized end points.

13. The system of claim 12 wherein said multiplexer adjusts a data rate of said frame encoded segments in said MPEG transport stream to a higher data rate for an entire duration of said segments.

14. The system of claim 12 wherein said multiplexer adjusts a data rate of said frame encoded segments in said MPEG transport stream to a higher data rate for a portion of said segments.

15. The system of claim 12 wherein said selected capacity of said buffer is a value below an actual capacity of said buffer.

16. The system of claim 12 wherein said frame encoder encodes said digital data segments as if said segments did not have end points.

17. The system of claim 12 wherein said digital data segments include digital audio streams, and wherein said multiplexer creates said MPEG transport stream based on a selected capacity of said buffer being a value below an actual capacity of said buffer.

18. The system of claim 12 wherein said switching device buffer is a MPEG VBV buffer or a set-top box video decoder buffer.

19. The system of claim 12 wherein said switching device is a device capable of decoding MPEG-2 streams; a digital set-top box; a digital TV set or a DVD player.

* * * * *